United States Patent
Shellenberger

(10) Patent No.: US 10,737,593 B1
(45) Date of Patent: Aug. 11, 2020

(54) CAR SEAT

(71) Applicant: SUMMER INFANT (USA), INC., Woonsocket, RI (US)

(72) Inventor: Mitchell Shellenberger, Mount Joy, PA (US)

(73) Assignee: Summer Infant (USA), Inc., Woonsocket, RI (US)

( * ) Notice: Subject to any disclaimer, the term of this patent is extended or adjusted under 35 U.S.C. 154(b) by 0 days.

(21) Appl. No.: 16/460,972

(22) Filed: Jul. 2, 2019

Related U.S. Application Data

(60) Provisional application No. 62/693,054, filed on Jul. 2, 2018, provisional application No. 62/810,149, filed on Feb. 25, 2019.

(51) Int. Cl.
*B60N 2/26* (2006.01)
*B60N 2/28* (2006.01)
*B60N 2/42* (2006.01)

(52) U.S. Cl.
CPC ......... *B60N 2/2821* (2013.01); *B60N 2/2806* (2013.01); *B60N 2/2812* (2013.01); *B60N 2/2845* (2013.01); *B60N 2/2848* (2013.01); *B60N 2/2857* (2013.01); *B60N 2/2875* (2013.01); *B60N 2002/2815* (2013.01)

(58) Field of Classification Search
CPC .. B60N 2/2806; B60N 2/2812; B60N 2/2845; B60N 2/2848; B60N 2/2857; B60N 2/2875
USPC .................... 297/183.1, 183.2, 183.3, 183.4, 297/250.1–256.17, 216.11
See application file for complete search history.

(56) References Cited

U.S. PATENT DOCUMENTS

| | | | |
|---|---|---|---|
| D259,833 S | 7/1981 | Van Brouwer | |
| 4,516,806 A * | 5/1985 | McDonald | A47D 13/02 297/183.2 |
| 4,634,177 A * | 1/1987 | Meeker | B60N 2/2821 297/183.2 X |
| 4,943,113 A * | 7/1990 | Meeker | B60N 2/2821 297/256.16 X |
| 4,998,307 A * | 3/1991 | Cone | B60N 2/2806 297/183.2 |
| 5,011,221 A * | 4/1991 | Wise | A47D 1/002 297/183.3 |
| 5,115,523 A * | 5/1992 | Cone | B60N 2/2806 297/256.13 |
| 5,244,292 A * | 9/1993 | Wise | A47D 1/002 297/183.3 |
| 5,385,387 A * | 1/1995 | Kain | B60N 2/2806 297/256.16 X |
| D359,464 S | 6/1995 | Grasso et al. | |

(Continued)

FOREIGN PATENT DOCUMENTS

| | | |
|---|---|---|
| CN | 107089173 A | 8/2017 |
| JP | 2009190622 A | 8/2009 |

*Primary Examiner* — Rodney B White
(74) *Attorney, Agent, or Firm* — Adler Pollock & Sheehan P.C.

(57) ABSTRACT

An car seat that can be quickly attached and detached to a vehicle seat and a stroller. An example embodiment is a car seat that includes a carrier portion, a base portion, and a release handle coupled to the carrier for enabling detachment of the carrier from the base and stroller. The car seat includes a tension arm for releasably clamping a vehicle belt onto the base and tensioning the belt to secure the base portion to a vehicle seat.

17 Claims, 28 Drawing Sheets

(56) References Cited

U.S. PATENT DOCUMENTS

| | | | |
|---|---|---|---|
| 5,567,008 A * | 10/1996 | Cone, II | B60N 2/2821 297/256.16 X |
| 5,581,234 A * | 12/1996 | Emery | B60N 2/2821 297/250.1 |
| 5,658,044 A * | 8/1997 | Krevh | A47D 13/02 297/183.4 X |
| 5,660,430 A * | 8/1997 | Clarke | A47D 9/02 297/256.16 X |
| D389,426 S | 1/1998 | Merrick et al. | |
| D395,393 S | 6/1998 | Liistro et al. | |
| 5,806,924 A * | 9/1998 | Gonas | B60N 2/2821 297/250.1 X |
| 5,915,787 A * | 6/1999 | Brookman | B60N 2/2806 297/256.13 |
| 5,971,479 A * | 10/1999 | Jacquemot | B60N 2/2821 297/250.1 |
| 6,017,088 A * | 1/2000 | Stephens | A47D 13/02 297/256.16 X |
| 6,042,182 A | 3/2000 | Geis et al. | |
| 6,053,573 A * | 4/2000 | Nakagawa | B60N 2/0284 297/256.16 X |
| 6,070,890 A | 6/2000 | Haut et al. | |
| D427,463 S | 7/2000 | Celestina-Krevh | |
| D427,785 S | 7/2000 | Kassai | |
| 6,145,927 A * | 11/2000 | Lo | A47D 13/025 297/183.3 |
| 6,220,662 B1 * | 4/2001 | Franco-Vila | B60N 2/2806 297/256.16 X |
| 6,250,654 B1 | 6/2001 | Willis | |
| 6,254,183 B1 | 7/2001 | Bian et al. | |
| 6,299,249 B1 | 10/2001 | Mori | |
| 6,318,799 B1 | 11/2001 | Greger et al. | |
| 6,318,807 B1 * | 11/2001 | Perego | B62B 7/142 297/256.16 X |
| 6,322,142 B1 | 11/2001 | Yoshida et al. | |
| D451,312 S | 12/2001 | Kain | |
| D451,713 S | 12/2001 | Kain | |
| 6,331,032 B1 | 12/2001 | Haut et al. | |
| 6,347,832 B2 | 2/2002 | Mori | |
| 6,367,875 B1 * | 4/2002 | Bapst | A47D 13/02 297/256.16 X |
| 6,386,632 B1 * | 5/2002 | Goor | B60N 2/2806 297/256.16 X |
| 6,409,205 B1 * | 6/2002 | Bapst | B62B 7/06 297/256.16 X |
| 6,428,099 B1 * | 8/2002 | Kain | B60N 2/2806 297/256.16 X |
| 6,428,100 B1 | 8/2002 | Kain et al. | |
| D467,085 S | 12/2002 | Kamiki | |
| 6,494,535 B2 | 12/2002 | Galbreath | |
| 6,508,510 B2 | 1/2003 | Yamazaki | |
| 6,554,358 B2 | 4/2003 | Kain | |
| D474,714 S | 5/2003 | Karlsson et al. | |
| 6,588,849 B2 | 7/2003 | Glover et al. | |
| 6,592,183 B2 | 7/2003 | Kain | |
| 6,672,664 B2 * | 1/2004 | Yanaka | B60N 2/2806 297/256.16 X |
| 6,695,400 B2 | 2/2004 | Washizuka et al. | |
| 6,705,676 B1 | 3/2004 | Berringer et al. | |
| D491,735 S | 6/2004 | Kamiki | |
| 6,779,842 B2 | 8/2004 | McNeff | |
| 6,793,280 B2 | 9/2004 | Washizuka et al. | |
| 6,802,514 B2 | 10/2004 | Worth et al. | |
| 6,811,216 B2 | 11/2004 | Sedlack | |
| 6,834,915 B2 | 12/2004 | Sedlack | |
| 6,863,286 B2 | 3/2005 | Eros et al. | |
| 6,863,345 B2 | 3/2005 | Kain | |
| 6,893,040 B2 | 5/2005 | Hou et al. | |
| 6,979,057 B2 | 12/2005 | Sedlack | |
| D515,456 S | 2/2006 | Gastaldi | |
| 7,004,541 B2 | 2/2006 | Sedlack | |
| 7,017,921 B2 | 3/2006 | Eros | |
| 7,040,694 B2 | 5/2006 | Sedlack | |
| 7,059,676 B2 | 6/2006 | McNeff | |
| 7,059,677 B2 | 6/2006 | Balensiefer et al. | |
| 7,073,859 B1 | 7/2006 | Wilson | |
| 7,090,294 B2 | 8/2006 | Balensiefe et al. | |
| 7,163,265 B2 * | 1/2007 | Adachi | B60N 2/2806 297/256.16 X |
| D537,640 S | 3/2007 | Spence et al. | |
| 7,195,315 B2 | 3/2007 | Rikhof | |
| 7,207,628 B2 | 4/2007 | Eros | |
| 7,216,932 B2 | 5/2007 | Emmert | |
| 7,246,853 B2 * | 7/2007 | Harcourt | B60N 2/2812 297/256.16 X |
| 7,246,854 B2 | 7/2007 | Dingman et al. | |
| 7,246,855 B2 | 7/2007 | Langmaid et al. | |
| 7,252,342 B2 | 8/2007 | Patrizi et al. | |
| D552,014 S | 10/2007 | Chen et al. | |
| 7,300,113 B2 * | 11/2007 | Baloga | B60N 2/2803 297/256.16 X |
| D558,467 S | 1/2008 | Hou et al. | |
| 7,322,648 B2 | 1/2008 | Nakagawa et al. | |
| 7,325,871 B2 | 2/2008 | Gangadharan et al. | |
| 7,338,122 B2 | 3/2008 | Hei et al. | |
| 7,364,232 B2 | 4/2008 | Mees van der Biji et al. | |
| 7,387,315 B2 | 6/2008 | Nett et al. | |
| 7,426,771 B2 | 9/2008 | Patrizi et al. | |
| 7,429,079 B2 | 9/2008 | Baloga et al. | |
| 7,445,293 B2 | 11/2008 | Smith et al. | |
| 7,455,354 B2 | 11/2008 | Jane Santamaria | |
| 7,461,893 B2 | 12/2008 | Maciejczyk | |
| 7,472,955 B2 | 1/2009 | Crane et al. | |
| 7,488,034 B2 * | 2/2009 | Ohren | B60N 2/2821 297/256.16 X |
| 7,513,512 B2 | 4/2009 | Yoshie et al. | |
| 7,559,606 B2 | 7/2009 | Hei et al. | |
| 7,597,396 B2 | 10/2009 | Longenecker et al. | |
| D607,376 S | 1/2010 | Buday | |
| D617,239 S | 6/2010 | Storm | |
| 7,735,921 B2 | 6/2010 | Hutchinson et al. | |
| D620,719 S | 8/2010 | Li et al. | |
| D621,171 S | 8/2010 | Xu | |
| 7,770,970 B2 | 8/2010 | Hei et al. | |
| D624,760 S | 10/2010 | Hartenstine et al. | |
| 7,837,264 B2 | 11/2010 | van der Biji et al. | |
| 7,887,128 B2 | 2/2011 | Zink et al. | |
| 7,887,129 B2 | 2/2011 | Hei et al. | |
| 7,901,003 B2 | 3/2011 | Meeker et al. | |
| D636,190 S | 4/2011 | Werschmidt et al. | |
| 7,926,874 B2 | 4/2011 | Hendry | |
| 7,938,435 B2 | 5/2011 | Sousa et al. | |
| 7,950,738 B2 | 5/2011 | Shafer et al. | |
| 7,988,230 B2 * | 8/2011 | Heisey | B60N 2/2821 297/256.16 X |
| 8,007,043 B1 * | 8/2011 | Vuong | B60N 2/28 297/256.16 X |
| 8,033,555 B2 | 10/2011 | Mostert et al. | |
| 8,047,608 B2 | 11/2011 | Damiani et al. | |
| 8,056,975 B2 | 11/2011 | Longenecker et al. | |
| 8,070,226 B2 | 12/2011 | Dingler et al. | |
| 8,070,228 B2 * | 12/2011 | Karremans | B60N 2/2821 297/256.16 |
| 8,100,429 B2 | 1/2012 | Longenecker et al. | |
| 8,136,881 B2 | 3/2012 | Vertegaal | |
| 8,186,757 B2 * | 5/2012 | Duncan | B60N 2/2806 297/256.16 X |
| 8,226,162 B2 | 7/2012 | Campbell et al. | |
| 8,235,465 B2 | 8/2012 | Hei et al. | |
| 8,256,841 B2 | 9/2012 | Hei et al. | |
| 8,262,161 B2 * | 9/2012 | Fritz | B60N 2/2806 297/256.16 X |
| 8,317,265 B2 | 11/2012 | Hutchinson et al. | |
| 8,333,433 B2 | 12/2012 | Friedman | |
| 8,353,559 B2 | 1/2013 | Williams et al. | |
| 8,382,150 B2 | 2/2013 | Williams et al. | |
| 8,393,678 B2 * | 3/2013 | Keegan | B60N 2/2803 297/256.16 |
| 8,393,679 B2 | 3/2013 | Longenecker et al. | |
| 8,430,451 B1 * | 4/2013 | Heinz | B60N 2/286 297/256.16 X |

(56) References Cited

U.S. PATENT DOCUMENTS

| | | | |
|---|---|---|---|
| 8,434,821 B2 * | 5/2013 | Gibree | B60N 2/2806 |
| | | | 297/256.16 X |
| 8,434,828 B2 | 5/2013 | Arata et al. | |
| 8,449,030 B2 | 5/2013 | Powell et al. | |
| 8,464,919 B1 | 6/2013 | Goozdich | |
| 8,511,749 B2 | 8/2013 | Hei et al. | |
| 8,517,467 B2 | 8/2013 | Fritz et al. | |
| 8,544,952 B2 | 10/2013 | Keegan et al. | |
| 8,550,555 B2 * | 10/2013 | Fritz | B60N 2/2806 |
| | | | 297/256.16 X |
| 8,556,344 B2 | 10/2013 | Williams et al. | |
| 8,567,862 B2 | 10/2013 | Williams et al. | |
| 8,573,695 B2 | 11/2013 | Van Geer et al. | |
| 8,596,718 B2 | 12/2013 | Gaudreau et al. | |
| D697,323 S | 1/2014 | Williams et al. | |
| 8,678,499 B2 | 3/2014 | Kelly | |
| 8,684,454 B2 | 4/2014 | Chipman et al. | |
| 8,690,244 B2 | 4/2014 | Fritz et al. | |
| 8,714,639 B2 | 5/2014 | Heisey | |
| 8,746,793 B2 | 6/2014 | Powell et al. | |
| 8,752,895 B2 | 6/2014 | Fritz et al. | |
| 8,789,886 B2 | 7/2014 | Mason et al. | |
| 8,801,028 B2 | 8/2014 | Mazar et al. | |
| 8,840,184 B2 | 9/2014 | Szakelyhidi et al. | |
| 8,845,022 B2 * | 9/2014 | Strong | B60N 2/2824 |
| | | | 297/256.16 |
| 8,851,575 B2 | 10/2014 | Friedman | |
| 8,864,166 B2 | 10/2014 | Longenecker et al. | |
| 8,870,282 B2 | 10/2014 | Tew | |
| 8,882,196 B2 | 11/2014 | Williams et al. | |
| 8,915,547 B2 | 12/2014 | Longenecker et al. | |
| 8,919,809 B2 | 12/2014 | Li | |
| 8,950,809 B2 | 2/2015 | Szakelyhidi et al. | |
| 8,955,856 B2 | 2/2015 | Guo | |
| 8,955,915 B2 | 2/2015 | Mason et al. | |
| 8,973,991 B2 | 3/2015 | Wuerstl | |
| 8,973,992 B2 | 3/2015 | Guo | |
| 8,974,005 B2 | 3/2015 | Mason et al. | |
| 8,998,312 B2 | 4/2015 | Sellers et al. | |
| D730,651 S | 6/2015 | Perego | |
| 9,056,567 B2 | 6/2015 | Wuerstl | |
| 9,061,609 B2 | 6/2015 | Hou et al. | |
| 9,061,619 B2 | 6/2015 | Mantke et al. | |
| 9,090,181 B2 | 7/2015 | Williams et al. | |
| D736,115 S | 8/2015 | Welch | |
| 9,108,654 B2 | 8/2015 | Kozinski | |
| 9,119,483 B1 | 9/2015 | Heisey | |
| 9,174,554 B2 | 11/2015 | Maciejczyk | |
| 9,187,016 B2 | 11/2015 | Strong et al. | |
| 9,216,670 B2 | 12/2015 | Heisey | |
| 9,242,585 B2 | 1/2016 | Kozinski | |
| 9,315,123 B2 | 4/2016 | Guo | |
| 9,352,669 B2 | 5/2016 | Spence et al. | |
| 9,365,135 B2 | 6/2016 | Carpenter | |
| 9,371,017 B2 * | 6/2016 | Spence | B60N 2/265 |
| 9,381,835 B2 | 7/2016 | Szakelyhidi et al. | |
| 9,403,449 B2 | 8/2016 | Longenecker et al. | |
| 9,440,562 B2 | 9/2016 | Heisey et al. | |
| 9,480,308 B2 | 11/2016 | Rouhana et al. | |
| 9,487,110 B2 | 11/2016 | Cohen et al. | |
| 9,499,074 B2 | 11/2016 | Strong et al. | |
| 9,522,615 B2 | 12/2016 | Longenecker et al. | |
| 9,527,411 B2 | 12/2016 | Szakelyhidi et al. | |
| 9,561,776 B2 | 2/2017 | Friedman | |
| D782,391 S | 3/2017 | Schaedler et al. | |
| 9,586,504 B2 | 3/2017 | Strong et al. | |
| 9,592,751 B2 | 3/2017 | Kirstein | |
| 9,610,867 B2 | 4/2017 | Tew | |
| D785,349 S | 5/2017 | Pos | |
| 9,676,303 B2 | 6/2017 | Hou et al. | |
| 9,676,304 B2 | 6/2017 | del Puerto Camargo et al. | |
| 9,688,167 B2 | 6/2017 | Hutchinson et al. | |
| 9,701,224 B2 | 7/2017 | Yang et al. | |
| D794,968 S | 8/2017 | Pos | |
| 9,725,017 B2 | 8/2017 | Imayou et al. | |
| 9,738,183 B2 | 8/2017 | Szlag | |
| 9,751,433 B2 | 9/2017 | Juchniewicz et al. | |
| 9,758,067 B2 | 9/2017 | Williams et al. | |
| 9,771,007 B2 | 9/2017 | Shellenberger | |
| 9,776,535 B2 | 10/2017 | Ishisako | |
| D815,569 S | 4/2018 | Kuenen | |
| 9,937,823 B2 | 4/2018 | Williams et al. | |
| 9,950,643 B2 | 4/2018 | Ishijima | |
| 9,963,051 B2 | 5/2018 | Strong et al. | |
| D824,284 S | 7/2018 | Mojica | |
| 10,023,079 B2 | 7/2018 | Zhao | |
| 10,035,436 B2 | 7/2018 | Zhou | |
| 10,040,377 B2 | 8/2018 | Mason et al. | |
| 10,052,981 B2 | 8/2018 | Wright | |
| 10,053,131 B2 | 8/2018 | Ruggiero et al. | |
| 10,099,580 B2 | 10/2018 | Anderson et al. | |
| D833,598 S | 11/2018 | Nordensson Spangberg et al. | |
| D837,538 S | 1/2019 | Imrich et al. | |
| 10,166,890 B1 | 1/2019 | Beard et al. | |
| 10,189,381 B2 | 1/2019 | Williams et al. | |
| 10,220,739 B2 | 3/2019 | Okuhara et al. | |
| 10,239,550 B2 | 3/2019 | Ruggiero et al. | |
| 10,252,646 B2 | 4/2019 | Hutchinson et al. | |
| 10,258,166 B2 | 4/2019 | Williams et al. | |
| 10,259,423 B2 | 4/2019 | Friedman | |
| 10,266,077 B2 | 4/2019 | Mason et al. | |
| D847,520 S | 5/2019 | Imrich et al. | |
| 10,299,609 B2 * | 5/2019 | Taylor | B60N 2/2821 |
| 10,315,538 B2 | 6/2019 | Hutchinson et al. | |
| 10,336,219 B2 | 7/2019 | Mason et al. | |
| 10,351,027 B2 | 7/2019 | Shellenberger | |
| 2001/0004163 A1 * | 6/2001 | Yamazaki | B60N 2/2806 |
| | | | 297/256.16 |
| 2002/0109391 A1 | 8/2002 | Shie | |
| 2003/0015894 A1 * | 1/2003 | Bargery | B60N 2/2845 |
| | | | 297/250.1 X |
| 2003/0151220 A1 | 8/2003 | Hou | |
| 2003/0164632 A1 * | 9/2003 | Sedlack | A47D 13/02 |
| | | | 297/256.16 |
| 2003/0193226 A1 | 10/2003 | Kain | |
| 2004/0169411 A1 | 9/2004 | Murray | |
| 2005/0110318 A1 * | 5/2005 | Meeker | B60N 2/2812 |
| | | | 297/256.16 |
| 2005/0127640 A1 | 6/2005 | Worth et al. | |
| 2005/0127727 A1 * | 6/2005 | Gangadharan | B60N 2/2806 |
| | | | 297/256.16 |
| 2005/0168023 A1 | 8/2005 | Gangadharan et al. | |
| 2005/0184567 A1 | 8/2005 | Carpenter et al. | |
| 2006/0091709 A1 * | 5/2006 | Emmert | B60N 2/2806 |
| | | | 297/256.16 |
| 2007/0102989 A1 | 5/2007 | Smith et al. | |
| 2008/0018145 A1 * | 1/2008 | Tuckey | A47D 13/105 |
| | | | 297/183.3 |
| 2008/0067845 A1 | 3/2008 | Ohren et al. | |
| 2009/0295128 A1 | 12/2009 | Nagelski et al. | |
| 2011/0074194 A1 * | 3/2011 | Weber | B60N 2/2821 |
| | | | 297/256.16 X |
| 2011/0089726 A1 | 4/2011 | Gibree | |
| 2011/0089729 A1 | 4/2011 | Gibree | |
| 2011/0089731 A1 * | 4/2011 | Gibree | B60N 2/2806 |
| | | | 297/250.1 |
| 2011/0089732 A1 * | 4/2011 | Yang | B60N 2/2824 |
| | | | 297/256.16 |
| 2011/0140491 A1 * | 6/2011 | Williams | B60N 2/2806 |
| | | | 297/256.16 |
| 2011/0254331 A1 | 10/2011 | Nagelski et al. | |
| 2011/0298259 A1 * | 12/2011 | Heisey | B60N 2/2821 |
| | | | 297/256.16 |
| 2012/0013159 A1 * | 1/2012 | Williams | B60N 2/2821 |
| | | | 297/256.16 |
| 2012/0013160 A1 * | 1/2012 | Williams | B60N 2/2821 |
| | | | 297/256.16 |
| 2012/0181822 A1 * | 7/2012 | Williams | B60N 2/2806 |
| | | | 297/256.16 X |
| 2012/0261958 A1 | 10/2012 | Hutchinson et al. | |
| 2012/0261961 A1 * | 10/2012 | Heisey | B60N 2/2827 |
| | | | 297/256.16 |
| 2013/0075992 A1 | 3/2013 | Zhu | |

(56) References Cited

U.S. PATENT DOCUMENTS

| | | |
|---|---|---|
| 2013/0285424 A1 | 10/2013 | Gardner |
| 2014/0008951 A1* | 1/2014 | Spence .................. B60N 2/265 297/250.1 |
| 2014/0008955 A1 | 1/2014 | Spence et al. |
| 2014/0052342 A1 | 2/2014 | Seibert |
| 2014/0361589 A1* | 12/2014 | Hou .................... B60N 2/2824 297/256.16 |
| 2015/0091348 A1 | 4/2015 | Juchniewicz et al. |
| 2015/0183341 A1* | 7/2015 | Carpenter ............ B60N 2/2821 297/256.16 |
| 2015/0257545 A1* | 9/2015 | Heisey ................ A47D 15/006 297/256.16 X |
| 2015/0336481 A1 | 11/2015 | Horsfall |
| 2016/0031343 A1 | 2/2016 | Juchniewicz et al. |
| 2016/0059746 A1 | 3/2016 | Finnestad et al. |
| 2016/0121848 A1 | 5/2016 | Seibert |
| 2016/0200225 A1* | 7/2016 | Van Der Veer ...... B60N 2/2812 297/256.16 |
| 2016/0221479 A1 | 8/2016 | Shellenberger |
| 2016/0311345 A1 | 10/2016 | Morgenstern |
| 2016/0347212 A1 | 12/2016 | Mason et al. |
| 2017/0021800 A1 | 1/2017 | Seibert |
| 2017/0065098 A1 | 3/2017 | Taylor et al. |
| 2017/0217339 A1 | 8/2017 | Strong |
| 2017/0274867 A1 | 9/2017 | Friedman |
| 2018/0015848 A1 | 1/2018 | Pacella |
| 2018/0029625 A1 | 2/2018 | Ruggiero et al. |
| 2018/0050656 A1 | 2/2018 | Kim |
| 2018/0056822 A1 | 3/2018 | Anderson et al. |
| 2018/0099588 A1 | 4/2018 | Anderson et al. |
| 2018/0111528 A1 | 4/2018 | Okuhara et al. |
| 2018/0201293 A1 | 7/2018 | Lee et al. |
| 2018/0236904 A1 | 8/2018 | Lehman |
| 2018/0251051 A1 | 9/2018 | Anderson et al. |
| 2018/0312085 A1 | 11/2018 | Mason et al. |
| 2018/0312188 A1 | 11/2018 | Haut et al. |
| 2018/0345827 A1 | 12/2018 | Anderson et al. |
| 2018/0362066 A1 | 12/2018 | Zhong |
| 2018/0370392 A1 | 12/2018 | Harmes et al. |
| 2019/0077282 A1 | 3/2019 | Reaves et al. |
| 2019/0077364 A1 | 3/2019 | Murray, Sr. et al. |
| 2019/0077436 A1 | 3/2019 | Ruggiero et al. |
| 2019/0084449 A1 | 3/2019 | Cohen et al. |
| 2019/0092193 A1 | 3/2019 | Houin |
| 2019/0135141 A1 | 5/2019 | Bennett et al. |
| 2019/0168706 A1 | 6/2019 | Friedman |
| 2019/0217751 A1 | 7/2019 | Kaiser |
| 2019/0217810 A1 | 7/2019 | Rock |

* cited by examiner

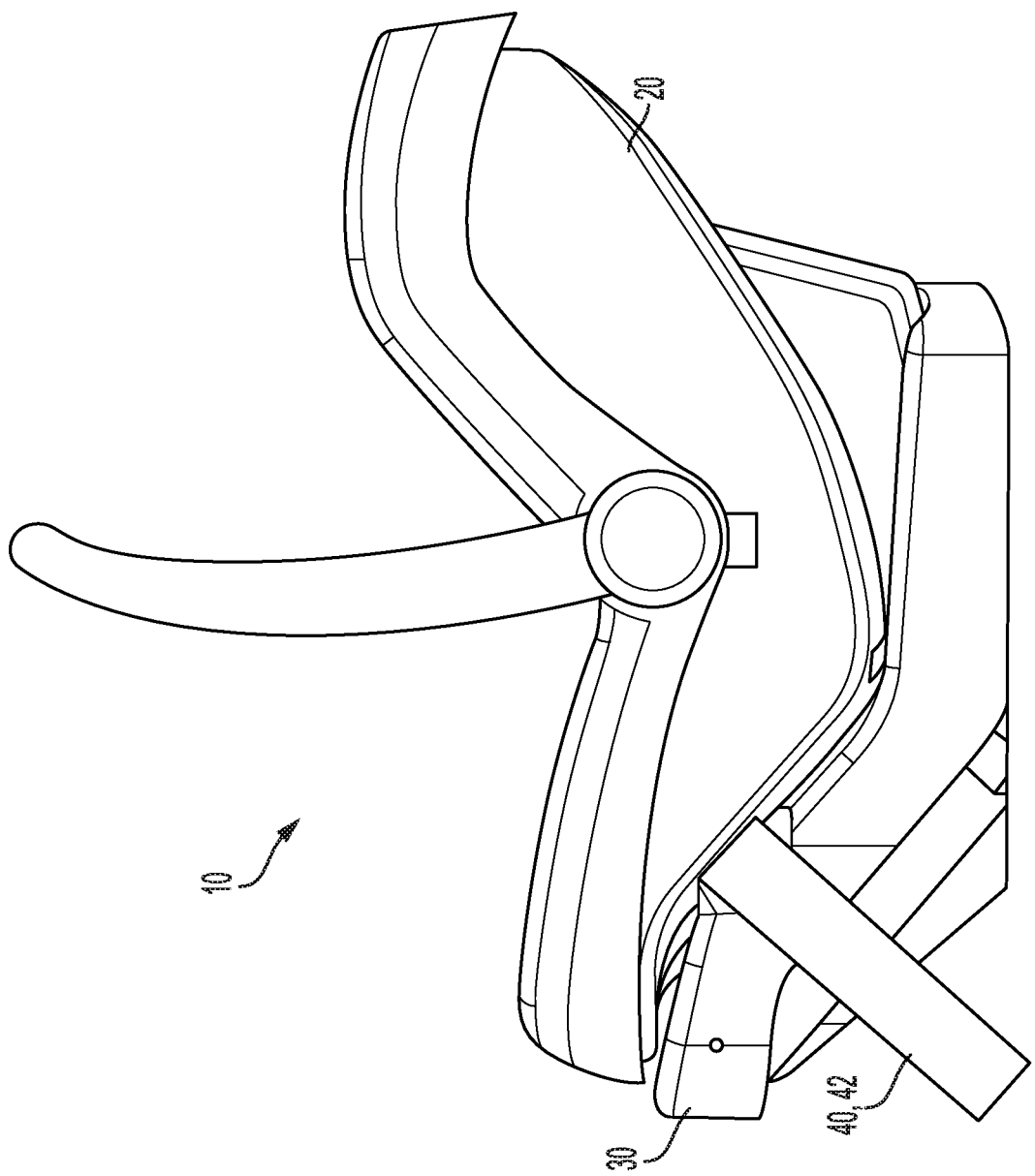

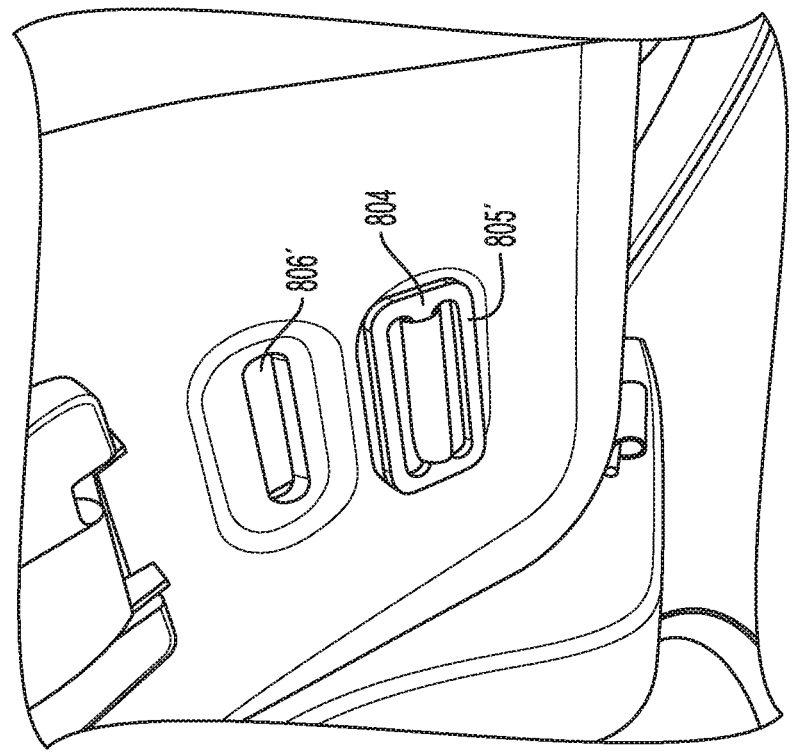
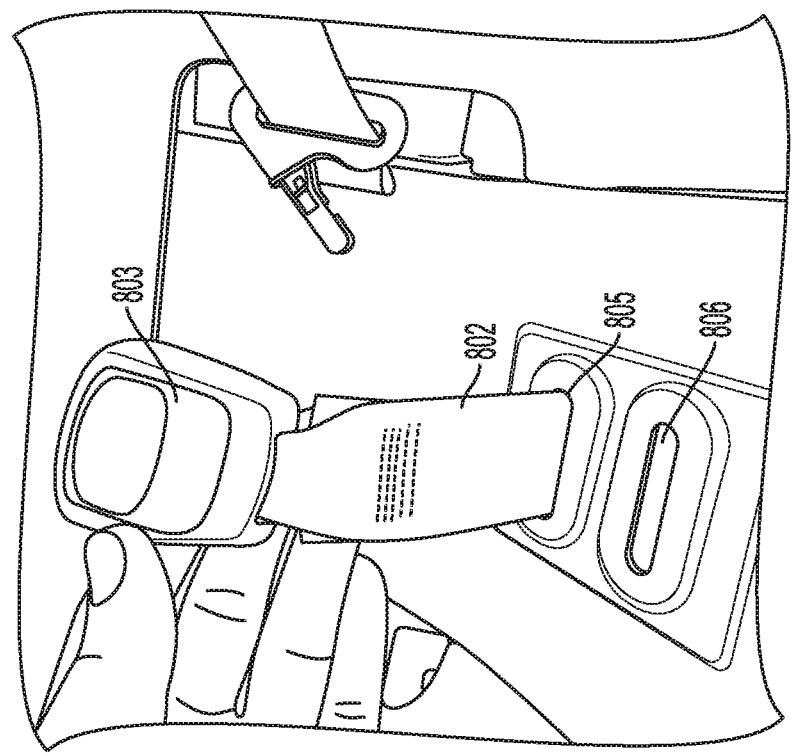
FIG. 8B

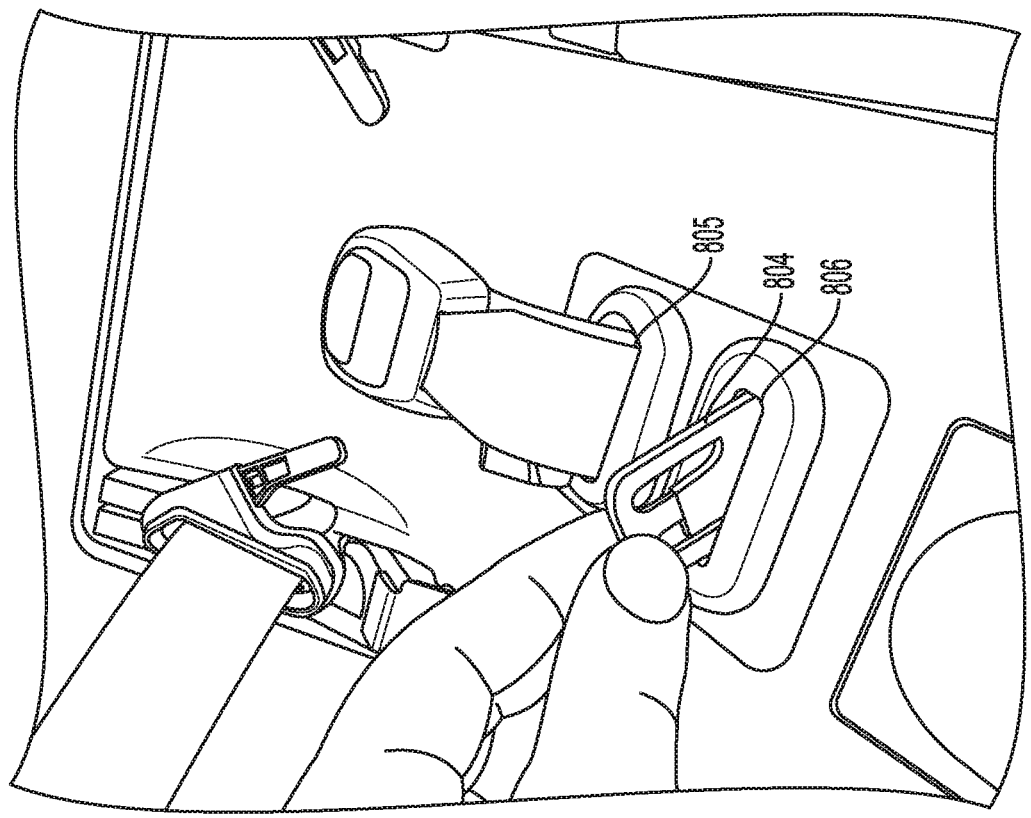
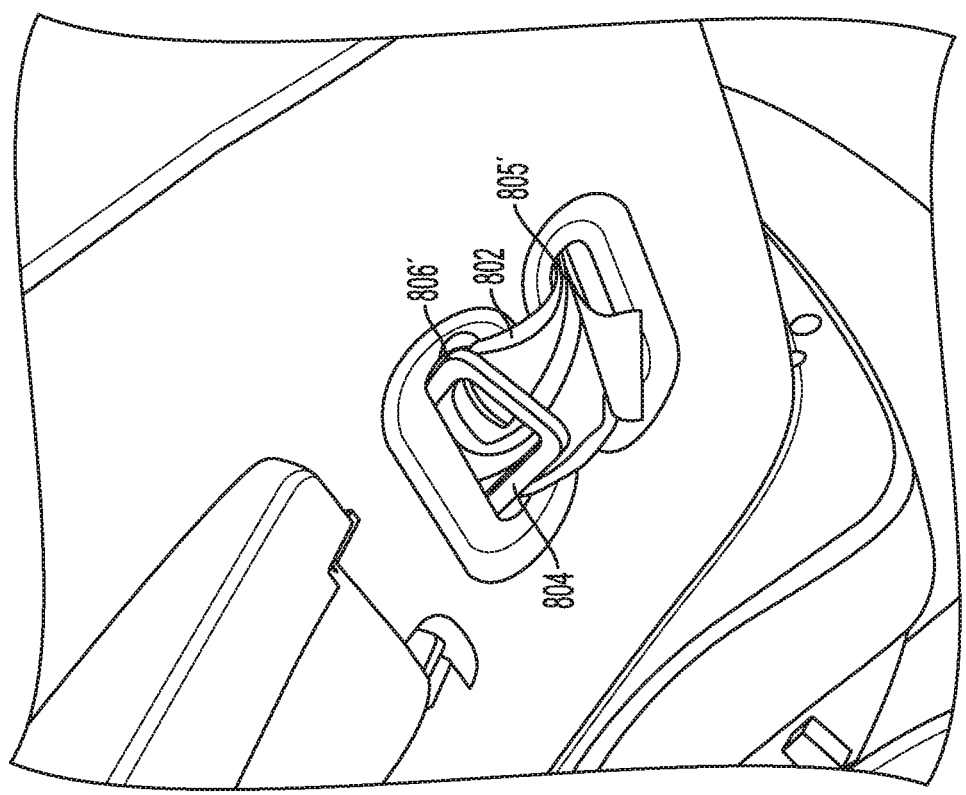
FIG. 8C

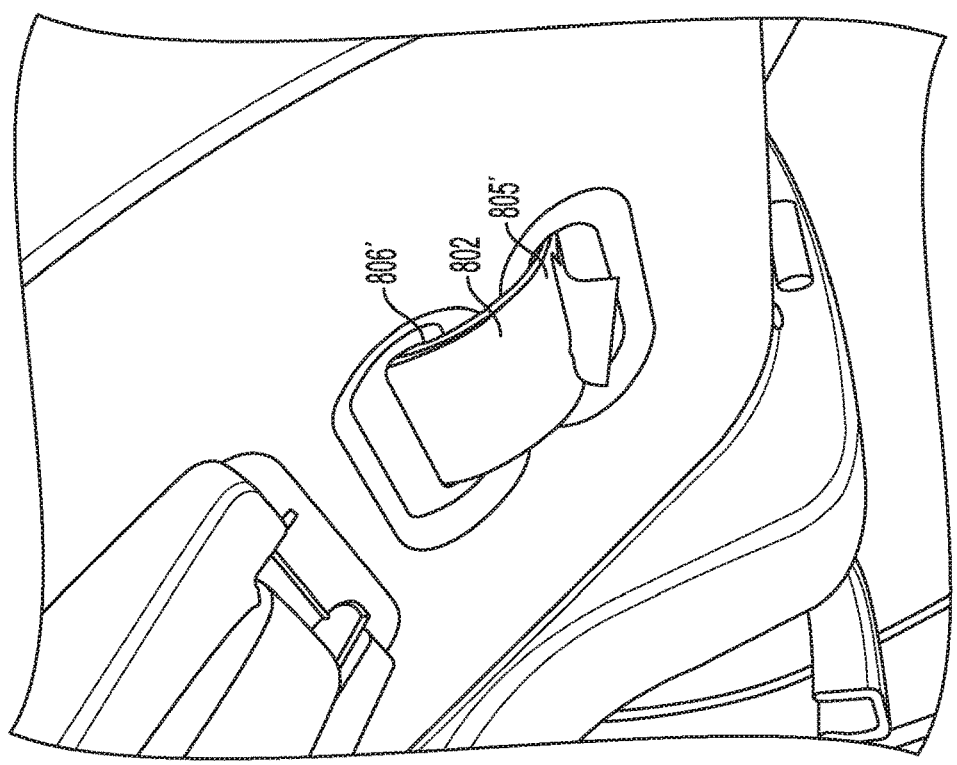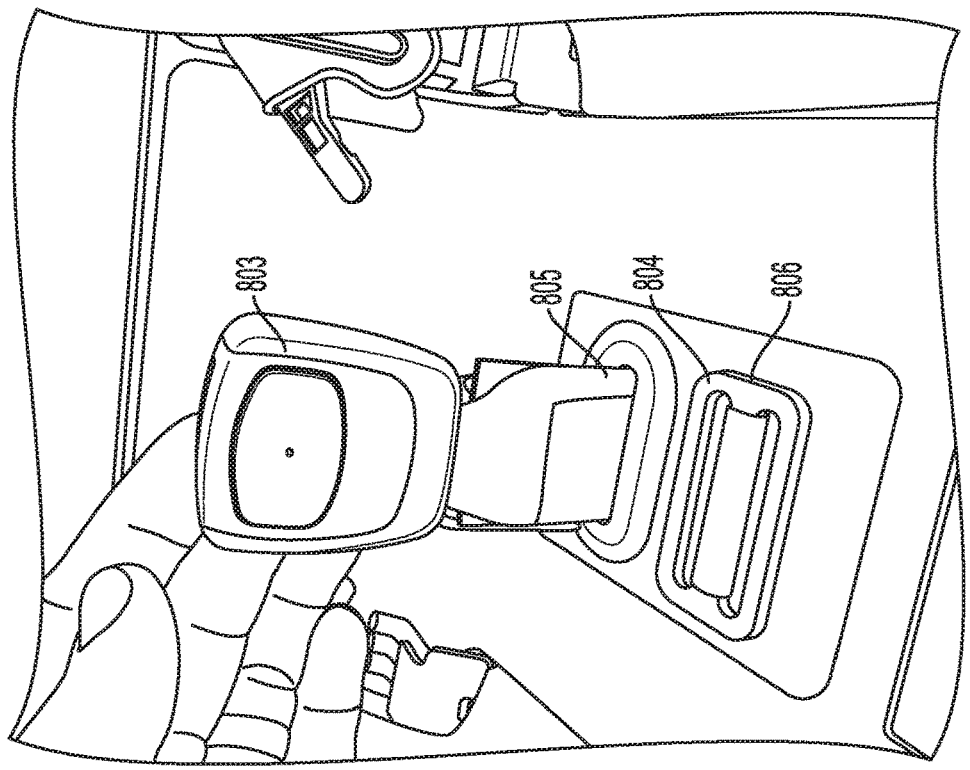
FIG. 8D

CAR SEAT

CROSS-REFERENCE TO RELATED APPLICATIONS

This application claims benefit from U.S. Provisional Patent Application Ser. No. 62/693,054, filed Jul. 2, 2018, and U.S. Provisional Patent Application Ser. No. 62/810,149, filed Feb. 25, 2019, both of which are incorporated herein by reference in their entirety.

FIELD OF THE INVENTION

The present invention relates generally to child passenger restraints, and more particularly to a car seat.

BACKGROUND

Vehicle car seats are required by law in many countries for transporting infants and children below certain age and weight thresholds. Even in countries and states that do not legally require car seats for transporting young children, oftentimes, parents will opt to utilize a car seat to protect their children in the event of an accident or crash. Many car seats have been designed to provide various features, such as, rear-facing attachments and the like. Conventional seating systems have incorporated some such features piecemeal, and thus may present countervailing disadvantages, such as unnecessary weight and bulk, difficulty in attaching and removing the car seat from a vehicle seat, and adjusting the car seat to accommodate a child's growth.

TERMS

The terms "carrier portion" and "carrier" are used interchangeably herein to refer to the same element.

The terms "base portion" and "base" are used interchangeably herein to refer to the same element.

The term "LATCH belt" means Lower Anchors and Tethers for Children belt.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect, the present invention provides an car seat that includes a carrier portion in which an infant or child can be secured, and a base portion to which the carrier portion can be releasably attached. A release handle located on the carrier portion can enable detachment of the carrier portion from the base portion.

One or more of the following features may be included. The base portion can be fastened to a vehicle seat with a vehicle belt or a LATCH belt assembly. In various embodiments, the car seat can be rear facing or forward facing. The base portion can include an angle-adjusting foot on a bottom surface of the base portion for adjusting the angle and fit between the base and the vehicle seat. The base portion can include at least one vehicle belt guide to enable placement of a vehicle belt on the base portion, a carrier alignment guide enabling placement of the carrier onto the base, and at least one carrier latch point to allow locking the carrier onto the base.

The base portion can include a tension arm that can be used to releasably clamp a vehicle belt into the base, and create tension in the belt to secure the base portion to the vehicle seat. As the tension arm is clamped down the vehicle belt or LATCH belt can be pulled into a belt path in the base portion. The belt path can receive and retain the tensioned vehicle belt to permit the carrier to be installed into the base. The base portion can include a storage area for storing multiple anchor latches, multiple slots to enable latch assembly webbing to enter the storage area, and a webbing retainer for attaching the latch assembly to the base portion outside the storage area.

In another aspect, the carrier portion can include a chest clip on a harness configured to restrain a child in the carrier. The chest clip can position the harness on the child. The chest clip includes two releasable interlocking portions. Each portion can have an actuator or button or other feature that a user can manipulate to engage the two portions and lock the chest clip. The chest clip can be unlocked and disengaged by simultaneous manipulation or actuation of both actuators.

In another aspect, the present invention can feature a car seat with a carrier portion that includes a carry handle that can be rotatably secured to handle hubs positioned on opposite sides of the carrier. A grip feature can be located under one or both of the handle hubs. The grip feature can provide a handgrip surface that can be used to carry or hold the carrier. The grip feature can be a cavity, slotted indentation or other feature that can be used as a handgrip. The grip feature can also be a post, protrusion, or other extending member that can be grasped by a user to carry or hold the carrier.

In another aspect, the invention features an car seat with a carrier portion that includes, a carry handle that is rotatably secured to handle hubs positioned on opposite sides of the carrier portion, and a handle latching mechanism coupled the carry handle and configured to enable the carry handle to be moved to a selected position from multiple available positions.

One or more of the following features may be included. The carry handle can be latched in a substantially vertical position above the carrier and prevented from moving in any direction. The carry handle can be positioned along an upper portion of the car seat and can be moved to a substantially vertical carry position above the carrier without actuating the handle latching mechanism and without pressing any buttons on the handle hubs. The carry handle can be positioned in an unlocked state along an upper portion of the car seat and can be moved to a substantially vertical and locked carry position above the carrier without actuating the handle latching mechanism. The carry handle can be rotated behind the car seat and latched in place to prevent the car seat from rocking. The carry handle can rotated in front of the car seat and latched in place to provide resistance to any rearward rotation of the car seat arising from sudden impact while the car seat is installed in a vehicle.

In another aspect, the invention features a car seat with a carrier portion that includes a stroller attachment mechanism for releasably attaching the car seat to a stroller. The attachment mechanism includes a first spring-loaded door and a second spring-loaded door located on opposite sides of the carrier. Each spring-loaded door can be configured to pivot inward with respect to the carrier thereby exposing a surface for a stroller attachment, such as a hook, to catch on.

The release handle on the carrier can be used to disengage the stroller attachment mechanism to release the carrier from the stroller. The spring-loaded doors can be configured to pivot to a closed position when the release handle is actuated. The spring-loaded doors can be configured to pivot inward in relation to the carrier in response to receiving a stroller attachment.

In another aspect, the invention features a car seat with a carrier portion that includes a detachable crotch belt having (1) a strap having a first end and a second end and a length between its two ends, (2) a clip can be coupled to the first end of the strap, and (3) a buckle can be coupled to the second end of the strap and configured to releasably attach to a harness for securing a child in the carrier. The carrier portion can further include multiple slots on a seat portion of the carrier for releasably securing the crotch belt to the carrier, and adjusting the length and position of the crotch belt.

The crotch belt can be utilized at its full length by passing the clip through one of the slots and securing the clip on an opposite side of the slot. The position of the crotch belt can be adjusted by passing the clip through one or more of the slots and securing the clip on an opposite side of a selected slot. If the number of slots is two then the length of the crotch belt can be adjusted and shortened by passing the clip through one of the slots, then passing the clip through the adjacent slot and securing the clip on a top side of the second slot.

The invention may have one or more of the following advantages.

A vehicle belt path can be set independent of a position of the carrier in the base due to the fact that the belt is convoluted under the carrier by a belt tensioning system.

Installation process can be made much easier because of the leverage of the belt tensioning device, and the contour of the base bottom eliminates the issue presented by variable seat bight profiles and seat back recline angles.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 3 illustrates the carrier portion attached to the base portion in accordance with an embodiment of the present invention.

FIGS. 8A-8D illustrate an exemplary crotch belt assembly configured in accordance with an embodiment of the present invention.

DETAILED DESCRIPTION

Figure 1:
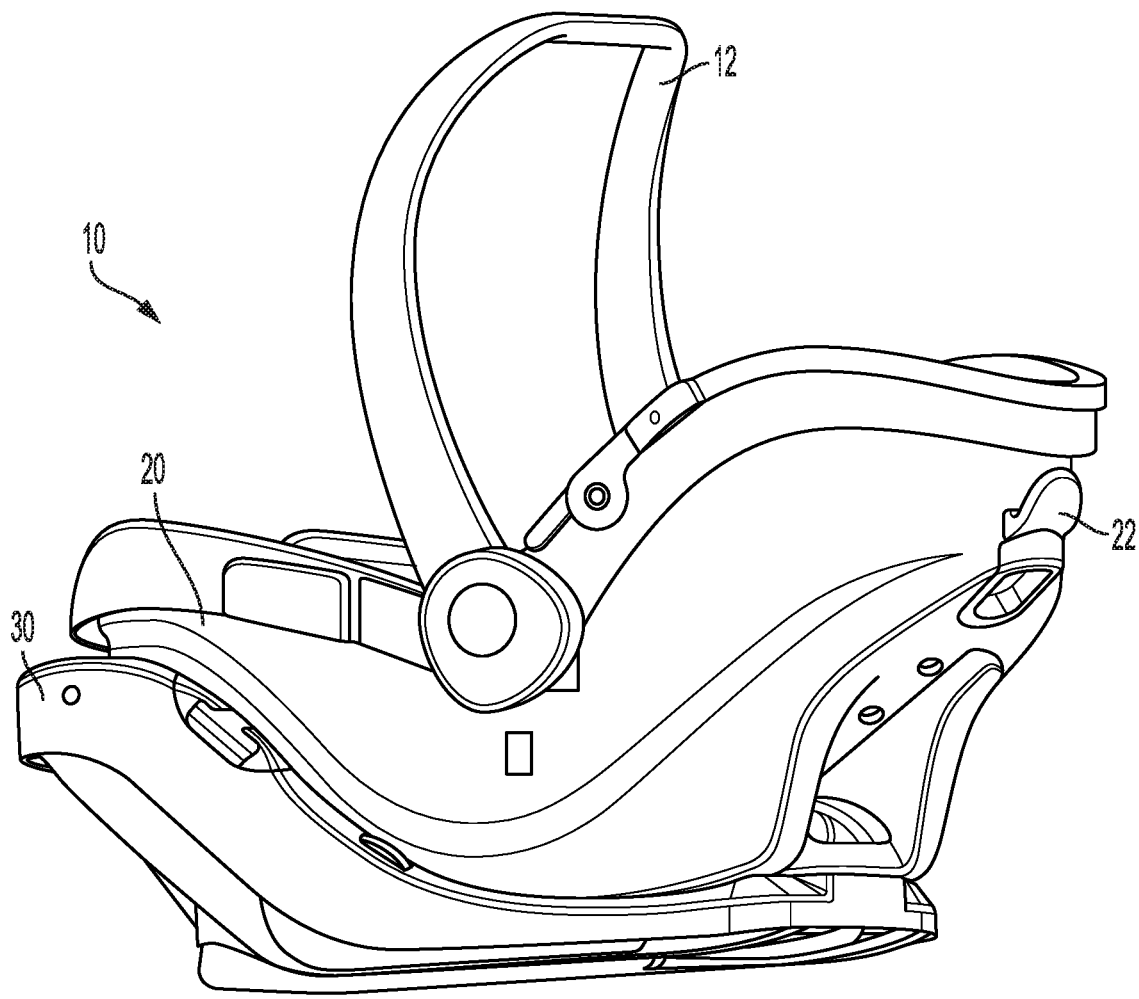
FIG. 1 illustrates an exemplary embodiment of a car seat configured in accordance with the present invention.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Referring to FIG. 1, in an embodiment, the present invention provides a car seat 10 that in various embodiments can be configured for use with infants and older children. The car seat 10 can include a carrier portion 20 in which a child can be secured, and a base portion 30 to which the carrier portion 20 can be attached. A release handle 22 located on the carrier portion 20 can enable detachment of the carrier 20 from the base 30. In various embodiments, the car seat 10 may be configured as a rear-facing or a forward-facing car seat.

Figure 2:
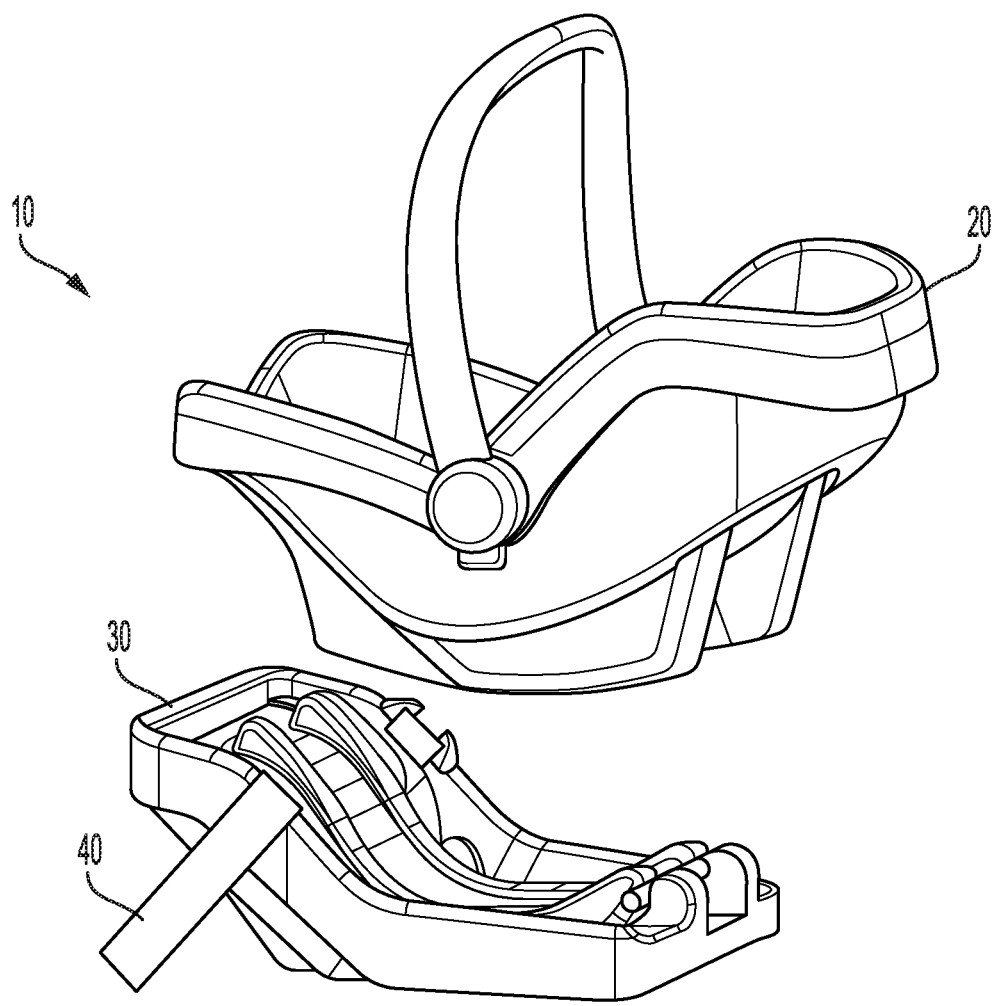
FIG. 2 illustrates a carrier portion separated from a base portion in accordance with an embodiment of the present invention.

Referring to FIGS. 2 and 3, the carrier portion 20 can be quickly attached and detached from the base portion 30. This feature enables the carrier 20 along with a seated child (not shown) to be removed from a vehicle without uninstalling the base 30 from the vehicle seat. The base portion 30 can be secured to a vehicle seat using a LATCH belt 40 or a vehicle belt 42 (e.g., standard safety belt).

Figure 4B:
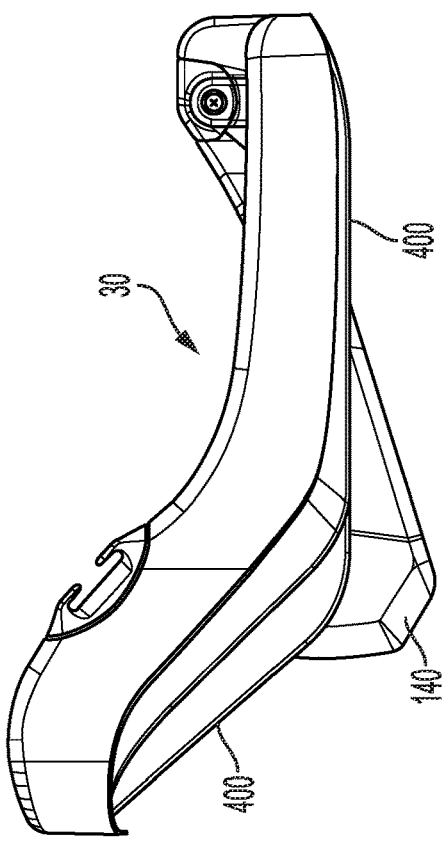
FIGS. 4A, 4B, and 4C illustrate features of the base portion in accordance with embodiments of the present invention.
Figure 4C:
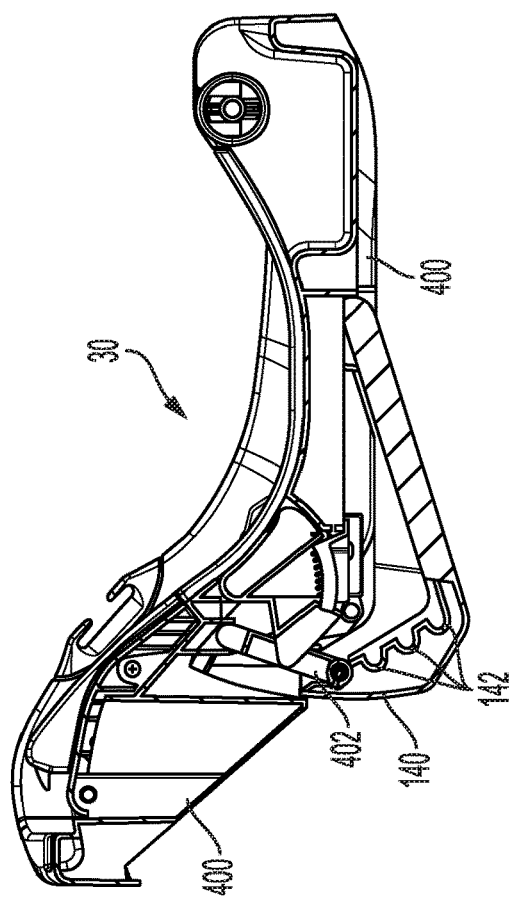
Figure 4A:
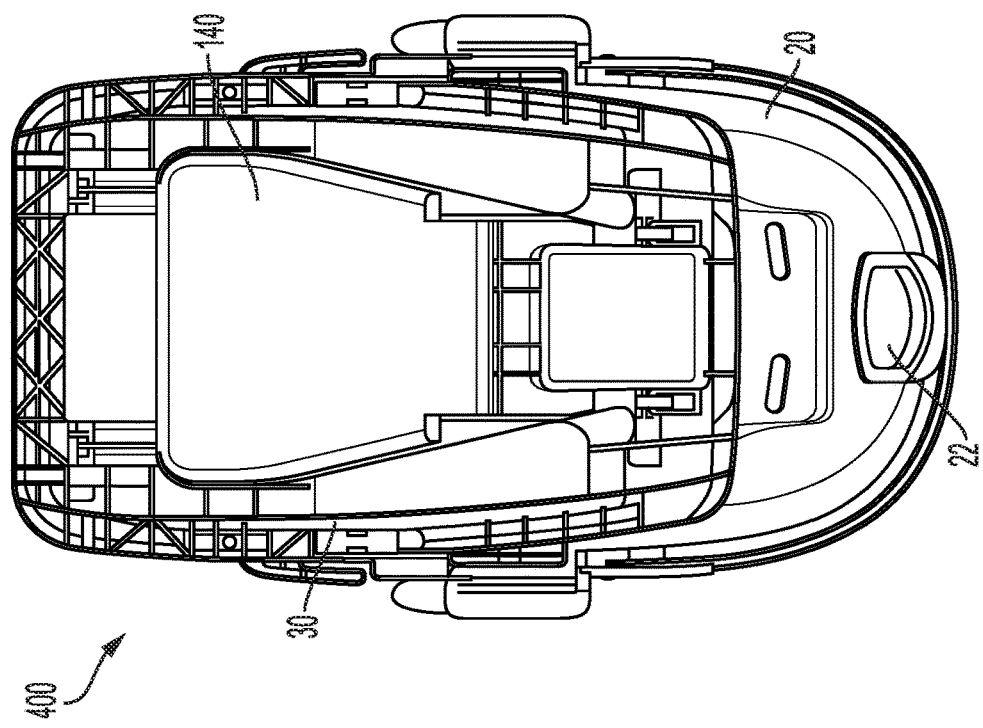

Referring to FIGS. 4A-4C, in an embodiment, the base portion 30 can be configured to adjustably fit a variety of vehicle seats. The base 30 can include a bottom surface 400 that is contoured to bridge a vehicle seat bight, and snuggly fit against a vehicle seat (not shown). Specifically, when the base 30 is secured to a vehicle seat with a LATCH belt 40 or a vehicle belt 42, the base 30 is pulled tightly and compressed against both the seat portion and backrest portion of the vehicle seat. This configuration can improve installation of the base portion 30 allowing for variation in the shape of the vehicle seat.

Moreover, in an embodiment, the base 30 can include an adjustable member, such as, an angle-adjusting foot 140 that can compensate for variations in the shape of vehicle seats. The angle-adjusting foot 140 can be raised or lowered from a bottom surface 400 of the base 30. To adjust the angle and fit between the base 30 and a vehicle seat, the angle-adjusting foot 140 can be raised or lowered to one of multiple positions 142, and secured in a selected position 142 via a locking member 402. The locking member 402 can be actuated by a lever 23 (See FIGS. 5A, 5B) or other actuator on the base 30.

Figure 5B:
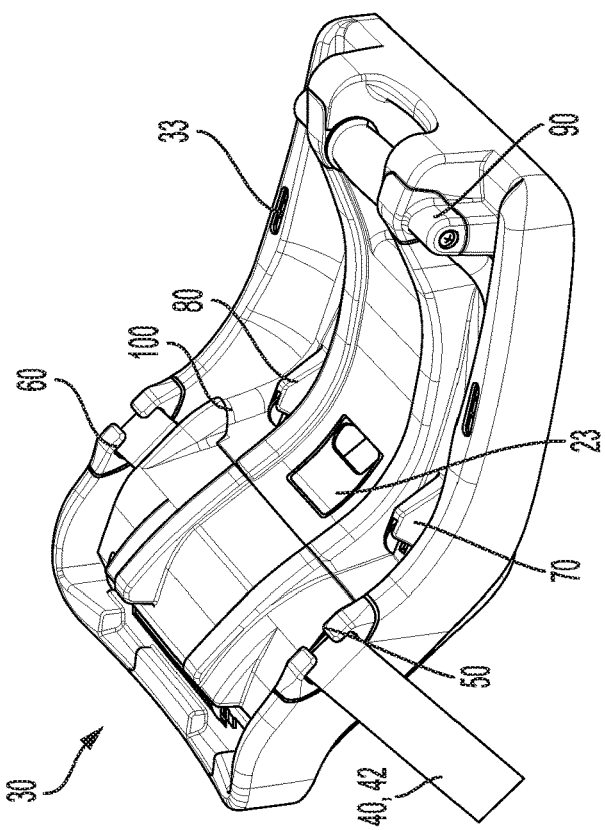
FIGS. 5A and 5B illustrate a tension arm configured for use with a base in accordance with an embodiment of the present invention.
Figure 5A:
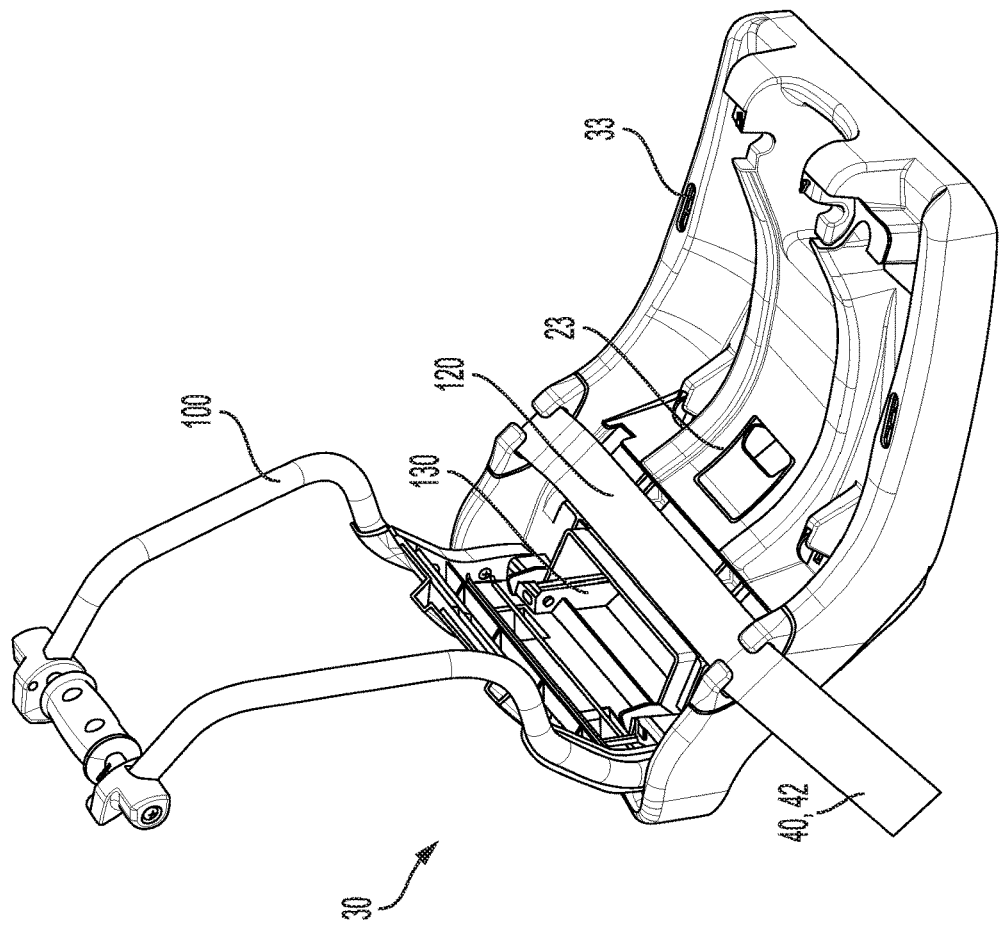
Figure 5D:
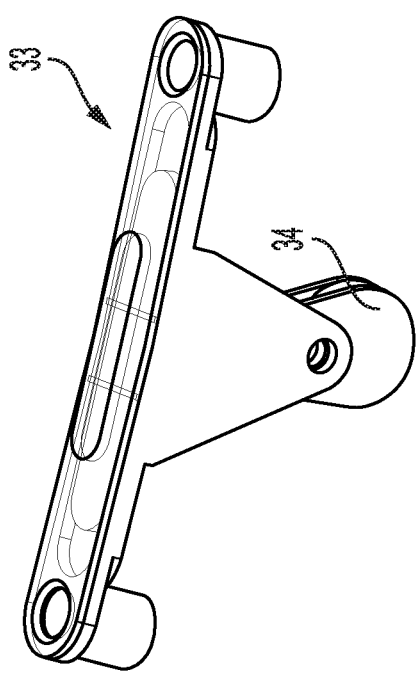
FIGS. 5C, 5D, 5E and 5F illustrate level indicators configured for use with a base in accordance with an embodiment of the present invention.
Figure 5E:
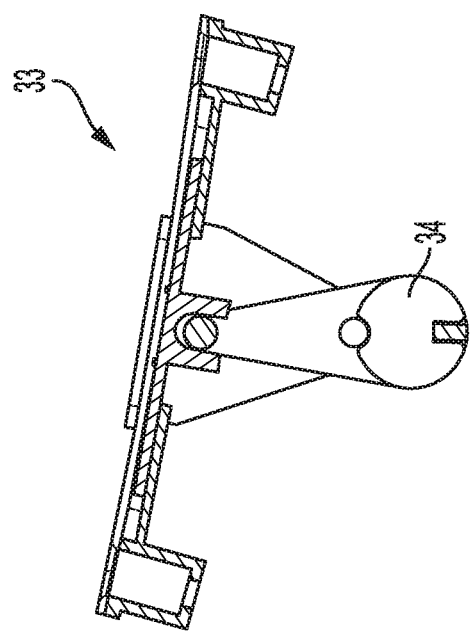
Figure 5C:
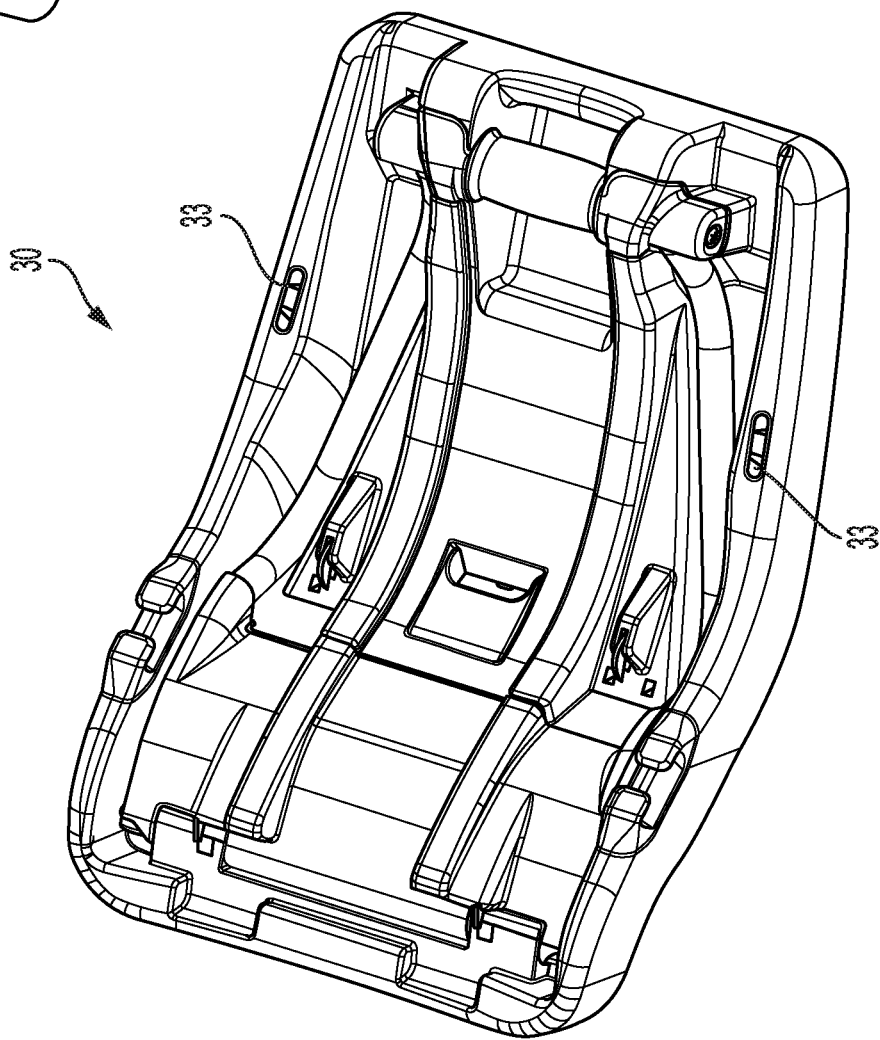
Figure 5F:
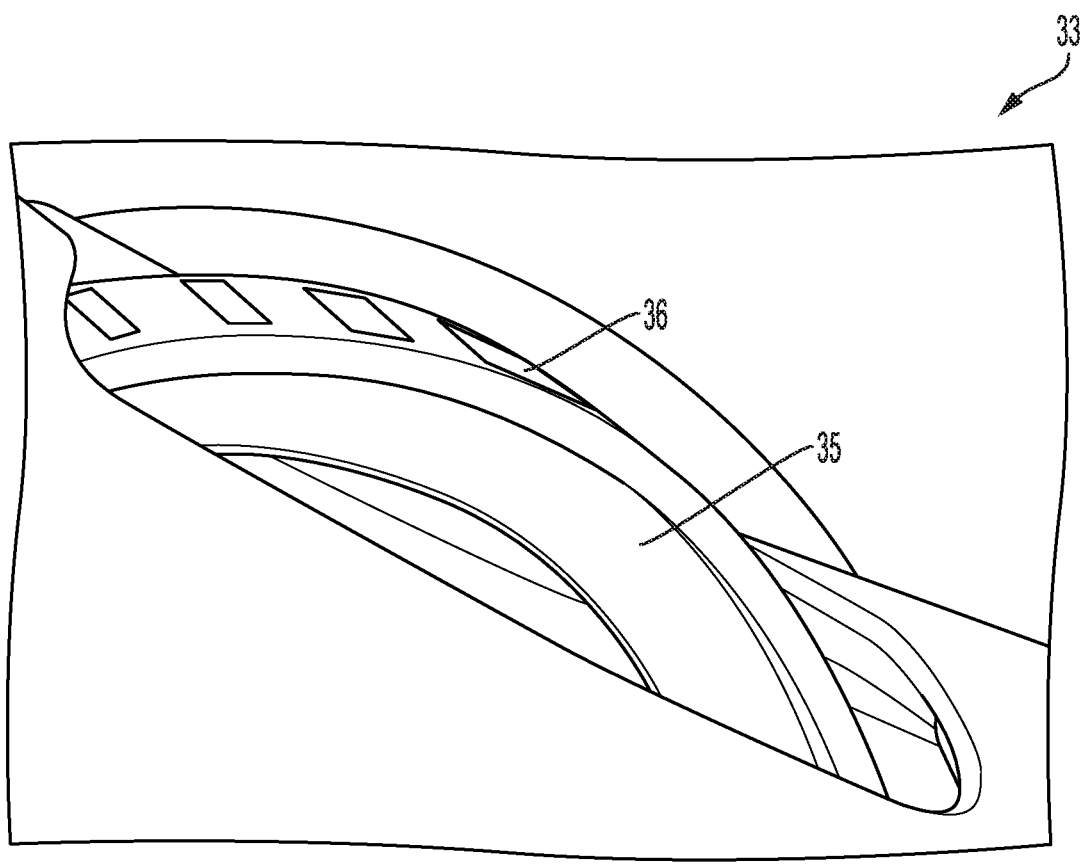

Referring to FIGS. 5A and 5B, in an embodiment, the base portion 30 can include: (1) a plurality of vehicle belt guides 50, 60 that enable placement of a LATCH belt 40 or vehicle belt 42 across a belt path 120 of the base portion 30; (2) a plurality of carrier latch points 70, 80 for locking the carrier 20 onto the base 30; (3) a carrier alignment feature 90 enabling placement of the carrier onto the base 30; and (4) a tension arm 100 for securing the LATCH belt 40 or vehicle belt 42 in the base 30. In other embodiments, the base 30 may include at least one vehicle belt guide and at least one carrier latch point.

In an embodiment, the tension arm 100 can be pivotally connected to the base 30, such that the tension arm 100 can be pivotally raised and lowered in and out of the base 30. The tension arm 100 can be configured to clamp the LATCH belt 40 (or vehicle belt 42) into the belt path 120 of the base 30, which tensions the LATCH belt 40 to secure the base 30 to a vehicle seat. During installation of the base 30 onto a vehicle seat, the tension arm 100 is raised upwards to expose the belt path 120. A vehicle belt 42 (or LATCH belt 40) can then be passed through the belt guides 50, 60 and across the belt path 120 and buckled to the vehicle seat. Once any slack in the vehicle belt 42 is removed, the tension arm 100 can be lowered into the base 30 and clamped down on the vehicle belt 42. This action forces the vehicle belt 42 into the belt path 120 in a convoluted configuration (i.e., from the vehicle seat, over the belt guide 50, under the tension arm 100, over the other belt guide 60, and back down to the vehicle seat) that tensions the base 30 into the vehicle seat. This action also retracts the tensioned vehicle belt 42 into the belt path 120, so that there is sufficient access for the carrier 20 to be installed into the base. In other words, the vehicle belt 42 is retracted and retained so that it does not obstruct the alignment and installation of the carrier to base.

Referring also to FIGS. 5C-5F, in an embodiment, the base 30 can include at least one level indicator 33 that can be utilized to determine whether the base 30 is in a level position in relation to a vehicle seat. In an embodiment, the level indicator 33 can be a sliding level indicator driven by a weighted pendulum 34. As the position of the base 30 is adjusted, the pendulum 34 drives the sliding indicator 33 to show when the base 30 it as its proper level. In another embodiment shown in FIG. 5F, the level indicator 33 can be a pendulum wheel 35 that has color coding to indicate when the base 30 is level.

Figure 6:
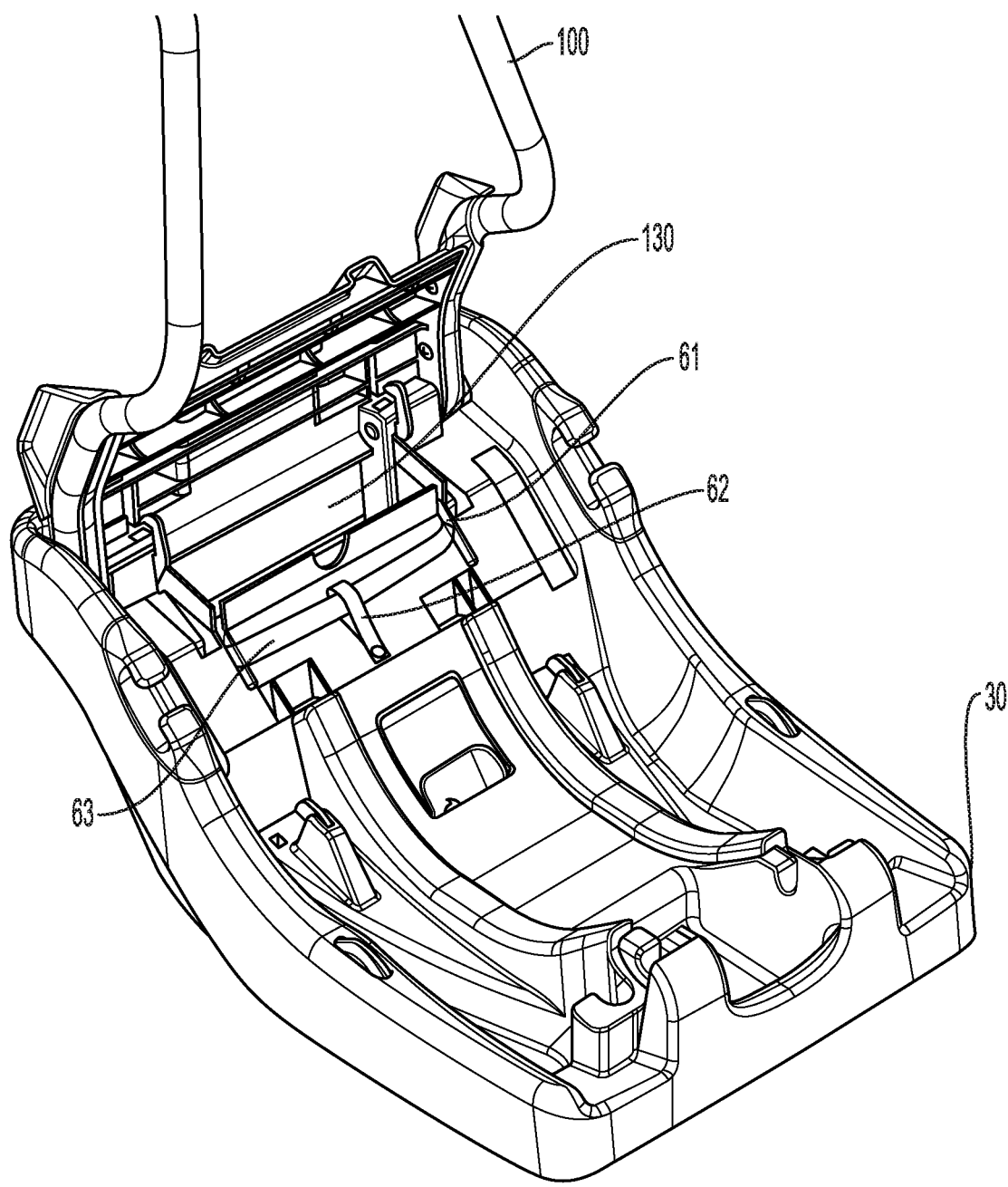
FIG. 6 illustrates exemplary accessory features of the base configured in accordance with an embodiment of the present invention.

Referring also to FIG. 6, in various embodiments, the base 30 can include (1) a storage area 130 located under the tension arm 100 for storing LATCH belt assemblies when not in use; (2) multiple slots 61 that enable latch assembly webbing 63 to enter the storage area 130; and (3) a webbing retainer 62 for attaching the latch assembly to the base 30 outside the storage area 130.

Figure 7:
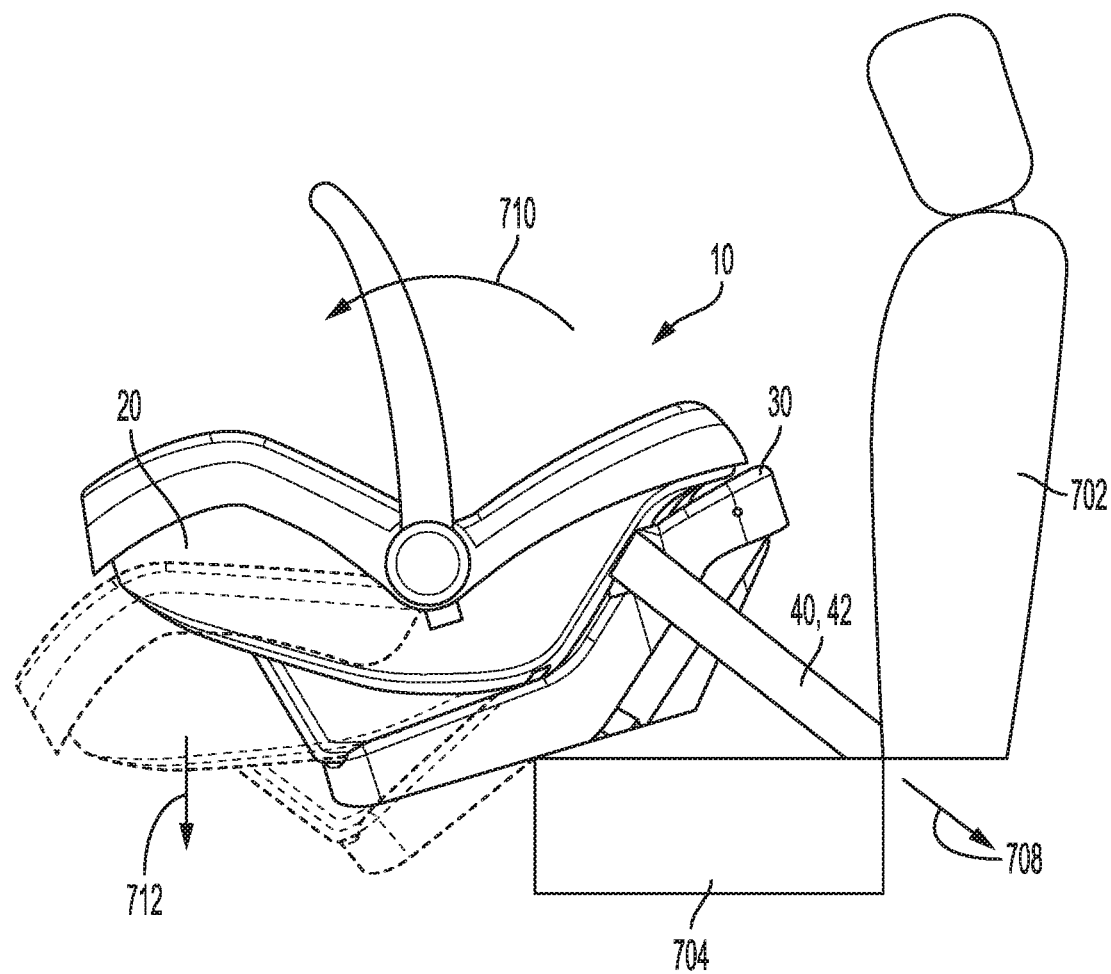
FIG. 7 illustrates an exemplary car seat configured in accordance with an embodiment of the present invention.

Referring to FIG. 7, in the event of a vehicle crash or accident, an installed car seat 10 can be subjected to various forces of impact. For example, upon impact, the car seat 10 may be thrown forward and away from a backrest 702 of the vehicle seat. The impacted car seat 10 is restrained only by a LATCH belt 40 or vehicle belt 42 and a countering belt tension force 708. When the car seat 10 reaches its maximum forward motion relative to the vehicle seat, the car seat 10 may be extending off the end of the vehicle seat 704.

As the weight of the car seat 10, and potentially that of a child, bear down on an end of the vehicle seat 704, a downward force 712 and rotational force 710 may be forcing the base 30 to bend over the end of the vehicle seat 704. Some prior art car seat bases overcome this by using high sidewalls on the base and location of the latch points connecting the carrier to the car seat base.

In contrast, in an embodiment, base 30 can include an internal frame of steel tubes for additional support. The tension arm 100 can also be made of steel and can resist the forces 710, 712 to prevent the base 30 from bending over the end of the vehicle seat 704. This configuration allows for the base 30 to have a low profile. The steel structure may also assist in transferring the forces from the front of the base (i.e., area being forced to bend over the end of vehicle seat 704) to the area where the LATCH belt 40 or vehicle belt 42 attaches the base 30 to the vehicle seat which may relieve stress in plastic parts of the base 30.

In partial summary, in various embodiments, the present invention provides a rear-facing or forward-facing car seat 10 that can include a carrier portion 20 in which an infant or child can be harnessed in, and a base portion 30 that can be fastened to a vehicle seat with a vehicle belt 42 or a LATCH belt 40. The carrier portion 20 can be releasably attached to the base 30, allowing the carrier 20 and child to be removed from the vehicle without uninstalling the base 30. The base 30 has a bottom surface 400 that can be contoured in such a way as to bridge the vehicle seat bight and contact both the seat portion and backrest portion of the vehicle seat. This improves the installation of the base 30 and allows for variation in the shape of the vehicle seat. The base 30 can further include a belt tensioning device (i.e., tension arm 100) that can be used to tension the vehicle belt 42 or the LATCH belt 40, thereby securing and tensioning the base 30 onto the vehicle seat. The belt tensioning device enables the LATCH belt 40 or vehicle belt 42 to be easily routed across the base 30, and allows a user to tension the belt 40, 42 with minimal force.

Figure 9:
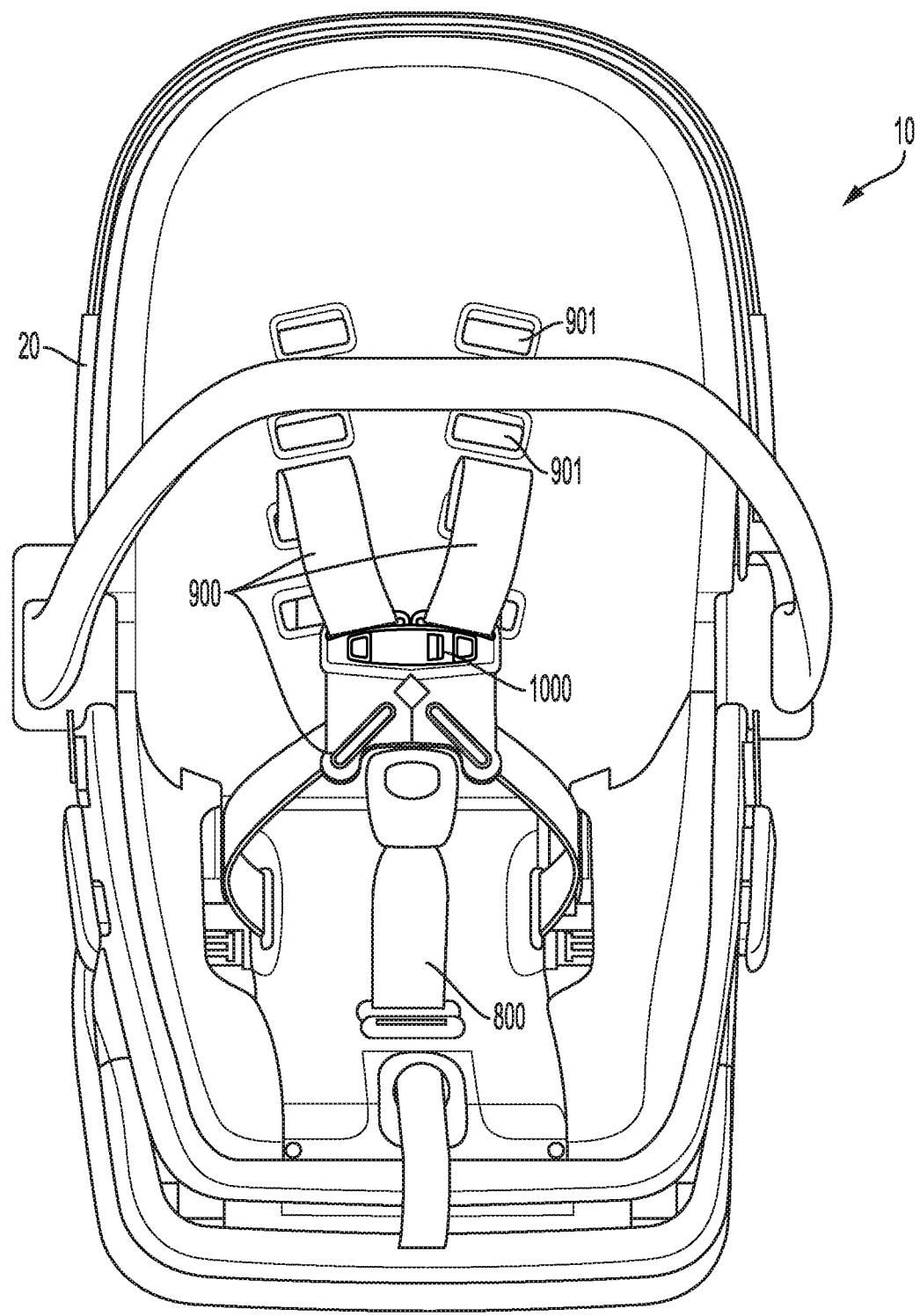
FIG. 9 illustrates a top view of an exemplary car seat with harness assembly configured in accordance with an embodiment of the present invention.

Referring to FIG. 9, in an embodiment, the car seat 10 can include a harness 900 disposed in the carrier portion 20 of the car seat 10. The harness 900 can be attached and fastened to the carrier 20 via multiple slots 901 located on the carrier 20. The harness 900 can be used to safely secure a child in the carrier 20. The harness 900 can include multiple adjustable straps and related fasteners such as buckles. In an embodiment, the harness 900 can include a chest clip 1000 that can be used to position the harness correctly on a child, and a crotch belt 800 that can be utilized to further secure a child in the carrier 20.

Referring to FIGS. 8A-8D, in an embodiment, the car seat carrier portion 20 can include multiple slots 805, 806 on a seat portion of the carrier 20. These slots 805, 806 can be utilized to secure a detachable crotch belt 800 to the carrier 20. The crotch belt 800 can be an integral part of the harness 900 to secure a child in the carrier 20. The slots 805, 806 can be utilized to adjust the position and length of the crotch belt 800 to accommodate children of various sizes. FIGS. 8A-8D depict only two slots 805, 806, but in various embodiments, there can be many more slots.

The detachable crotch belt 800 can include a strap 802 that can have a clip 804 on one end of the strap 802, and a buckle 803 or other fastener on the other end. The clip 804 can be used to attach the crotch belt 800 to the carrier 20 via one or more of the slots 805, 806. The buckle 803 can be used to releasably attach the crotch belt 800 to the harness 900.

Figure 8A:
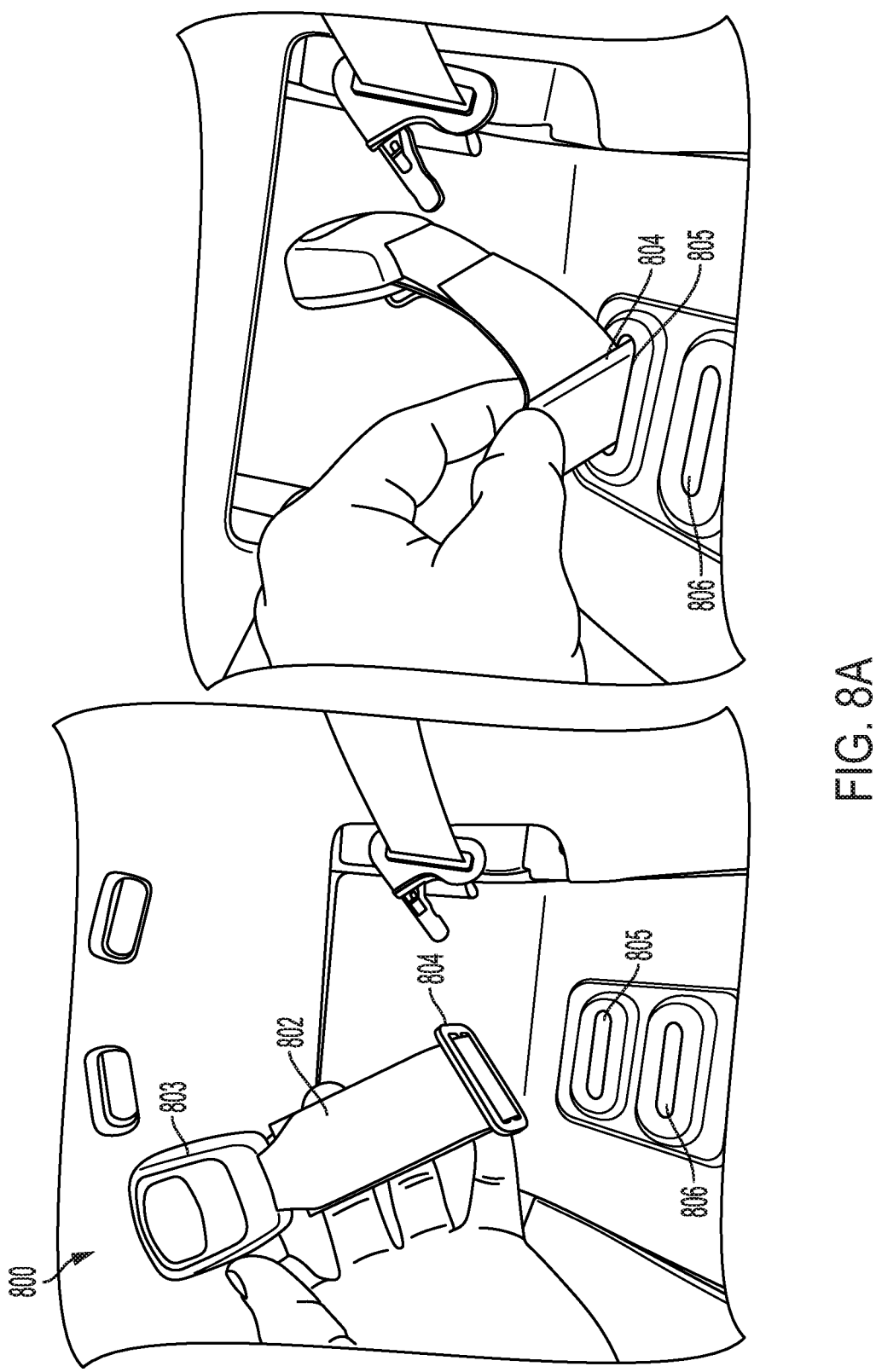

The position of the crotch belt 800 can be adjusted by connecting the belt 800 through one or more of the slots 805, 806. As shown in FIGS. 8A and 8B, the crotch belt 800 can be secured to the carrier and utilized at its full length by passing the clip 804 through one of the slots 805, and then flattening the clip 804 on an opposite side 805' of the slot 805 so that the clip 804 cannot pass back though the slot 805.

The length of the crotch belt 800 can be adjusted by passing the end of the strap 802 having the clip 804 through multiple slots 805, 806 and securing the clip on a selected slot. For example, as shown in FIGS. 8C and 8D, in a particular embodiment utilizing only two slots 805, 806, the length of the crotch belt 800 can be shortened by passing the clip 804 through one of the slots 805, then passing the strap and clip 804 up through the adjacent slot 806 and flattening the clip 804 on a top side of the second slot 806 to secure it in place. In FIGS. 8A-8D, the back side of slots 805, 806 are designated as 805', 806'.

Figure 10A:
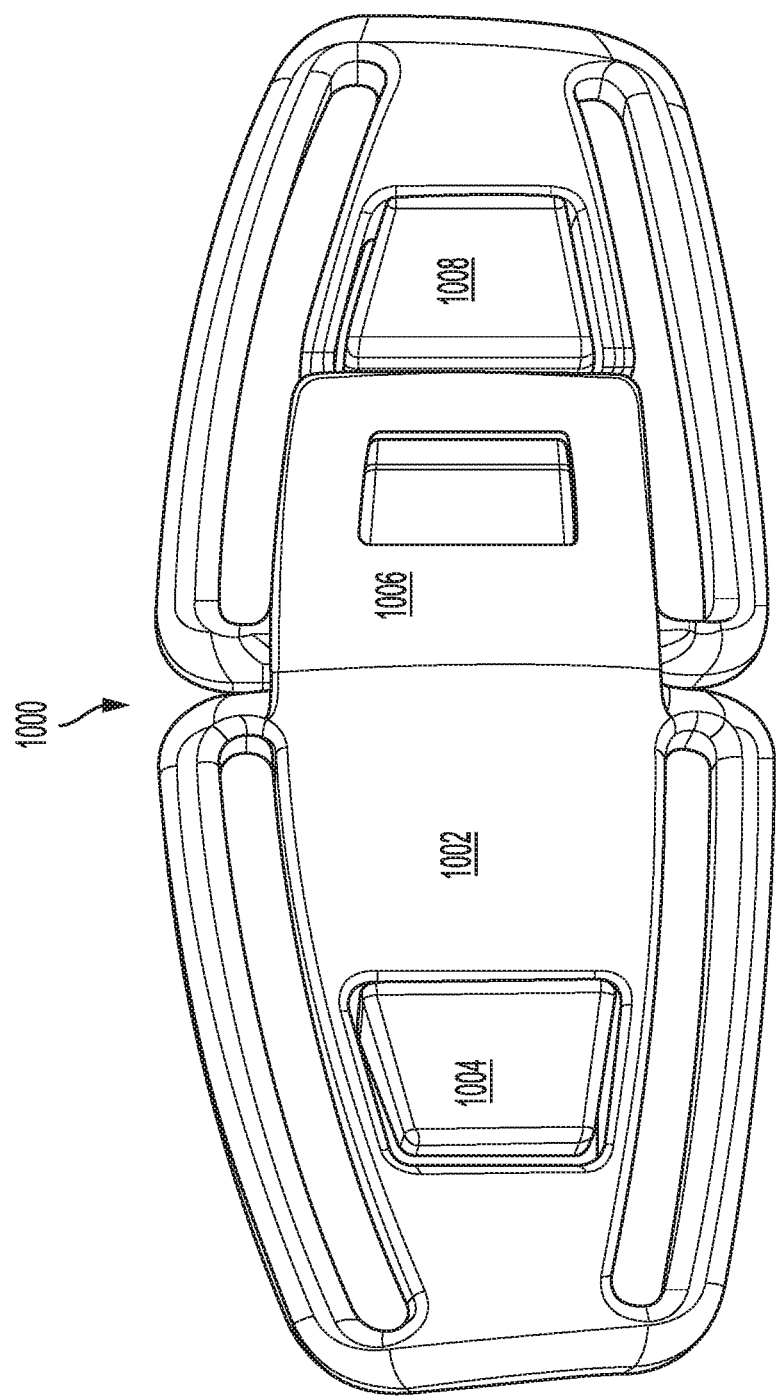
FIGS. 10A and 10B illustrate an exemplary chest clip configured in accordance with an embodiment of the present invention.
Figure 10B:
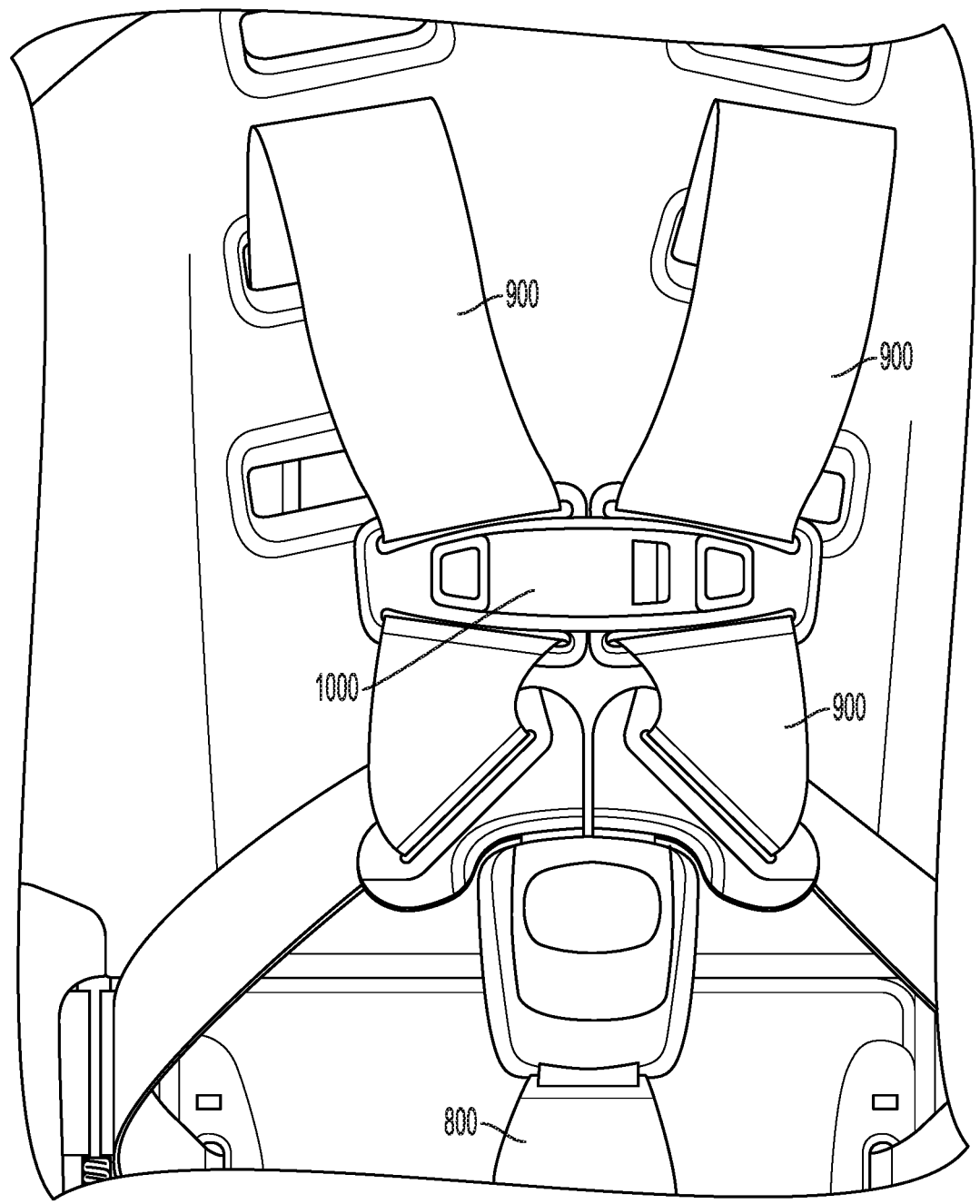

Referring to FIGS. 10A and 10B, in an embodiment, the carrier 20 can include a chest clip 1000 that can be attached to or an integral part of the harness 900. The chest clip 1000 can be configured to releasably secure and position the harness 900 on a child. The chest clip, in an embodiment, can include two releasable interlocking portions 1002, 1006. Each portion 1002, 1006 can have a respective actuator 1004, 1008, such as a button or other fastener, which a user can manipulate to releasably engage the two portions 1002, 1006 and lock the chest clip 1000. The chest clip 1000 can be unlocked and the two portions 1002, 1006 disengaged by simultaneous selection or actuation of both actuators.

Generally, the chest clip 1000 is a buckle device that can be used to position the harness 900 correctly on a child's chest so that in the event of a crash or other accident, the harness 900 can correctly restrain the child. The chest clip 1000 is not a crash device, but only a pre-crash positioner. The chest clip 1000, in an embodiment, can be threaded onto the harness 900 above the harness buckle, and positioned at the armpit level of the child. This configuration holds the harness webbing in a correct position over the child's chest. Chest clips come in varying sizes to be used with differing sizes of children.

The chest clip 1000 can be sized appropriately for use with infants and children. Because the chest clip is a pre-crash positioner, it is important that it is positioned correctly, and that it cannot be disengaged or opened by the child while seated in the car seat 10. If the child opened the chest clip, the child could potentially pull the harness 900 down off its shoulders and compromise the safety function of the harness 900 in a vehicle crash or accident.

The configuration of chest clip 1000 makes it difficult for a child to disengage and open the chest clip, due to the two interlocking portions 1002, 1006 having separate respective actuators 1004, 1008, which must be simultaneously selected to disengage and unlock the chest clip 1000. A young child may have difficulty figuring out that release requires pushing both buttons 1004, 1008 on the chest clip 1000 at the same time making unintended release less likely.

In addition, even if the child figured out the solution, a young child may not have the strength or manual dexterity to accomplish the task.

Figure 11B:
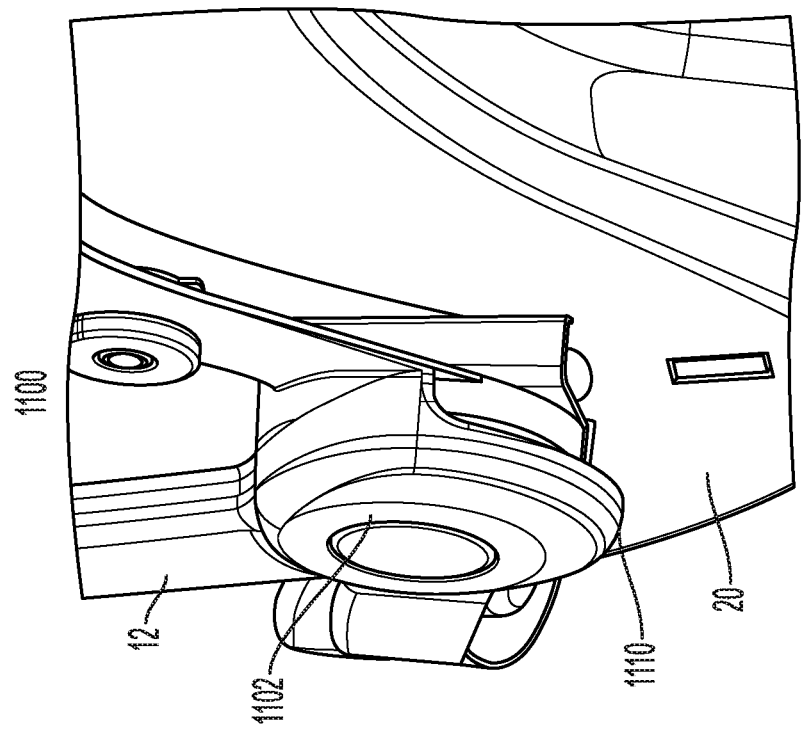
FIGS. 11A-11D illustrate an exemplary grip feature of the car seat configured in accordance with an embodiment of the present invention.
Figure 11A:
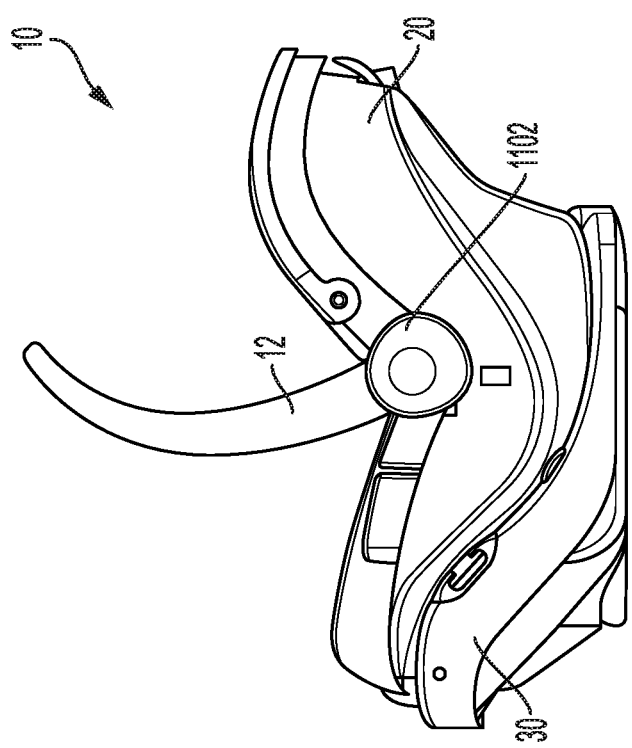
Figure 11D:
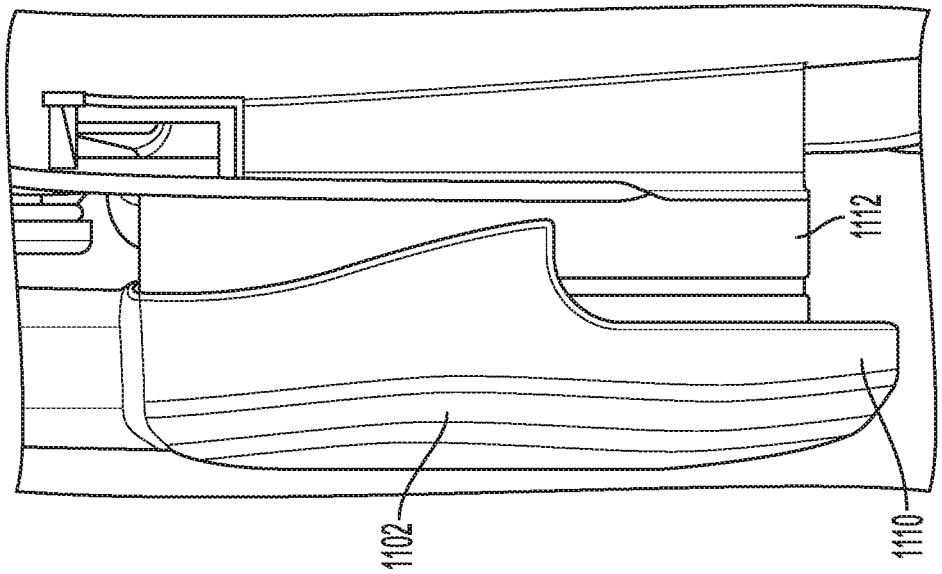
Figure 11C:
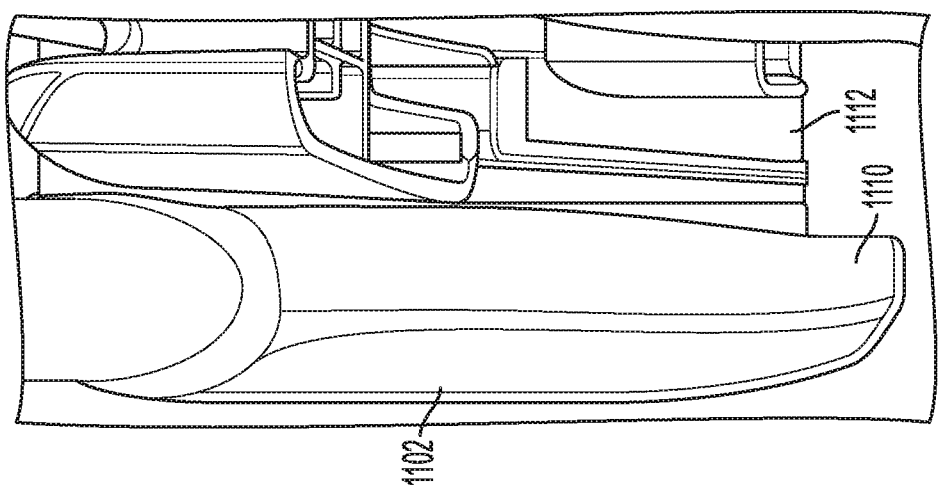

Referring to FIGS. 11A-11D, in an embodiment, the car seat 10 can include a carry handle 12 that can be rotatably secured to handle hubs 1102 located on opposite sides of the carrier 20. In an embodiment, a grip feature 1110 can be located under one or both handle hubs 1102. The grip feature 1110 provides a handgrip surface for convenience, which can be grasped by a user to carry or hold the carrier 20. In an embodiment, the grip feature 1110 can be configured as a cavity, slot, indentation or any other feature that can be used as a handgrip. In other embodiments, the grip feature 1110 can be a post, protrusion, or other extending member that can be grasped by a user to carry or hold the carrier 20. FIGS. 11C and 11D provide close-up front and rear views of the hub 1102, which illustrate that, in an embodiment, the grip feature 1110 can be formed simply by configuring the hub 1102 to partially extend beyond a connecting interface 1112 to form a handgrip surface, such as grip feature 1110.

Carriers can be held and carried in a variety of ways. For example, some people grasp the top of the handle and carry the carrier like a bucket. Others place their arm under the handle and carry the carrier in the crook of their elbow. Utilizing the grip feature 1110 described above, the carrier 20 can also be carried by weaving an arm around the handle 12 and grasping the hub 1102 closest to the user, and curling one's fingers around the grip feature 1110. An advantage of the grip feature 1110 is that it makes carrying the carrier 20 easier, and prevents a user's hand from slipping off the hub 1102.

Figure 12:
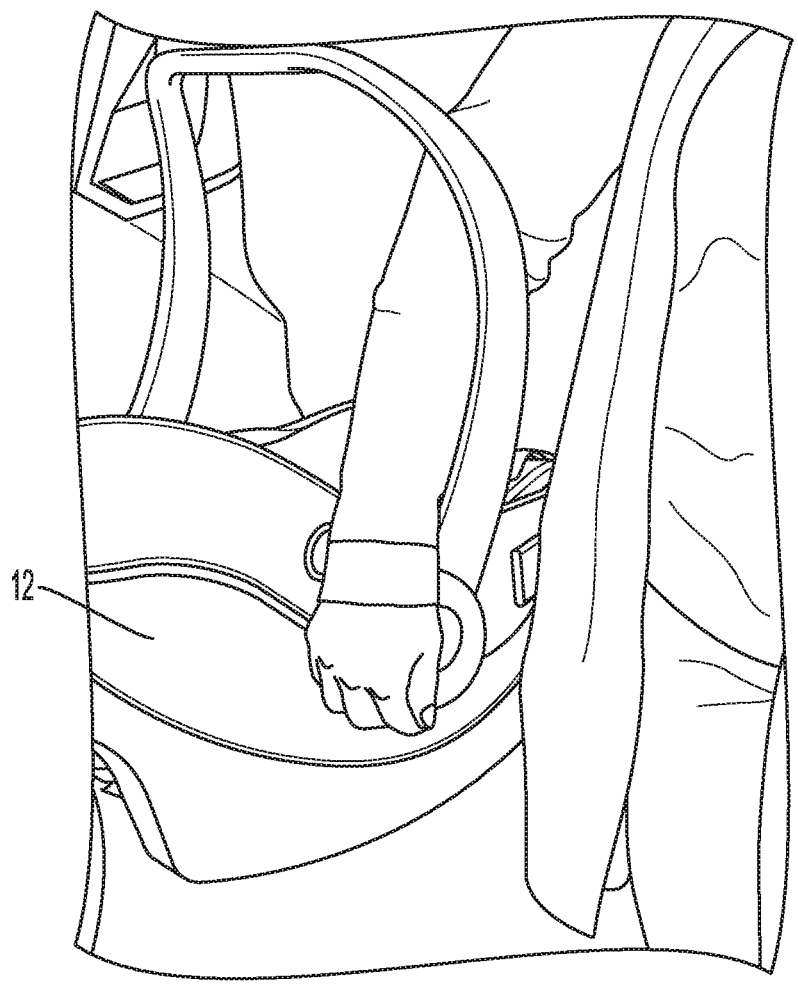
FIG. 12 illustrates a user carrying an exemplary carrier utilizing the grip feature of FIGS. 11A-11D in accordance with an embodiment of the present invention.

Moreover, when holding the carrier 20 this way, a user's arm is extended straight down and the carrier 20 can be held close to a user's body near the hip. As shown in FIG. 12, this carry method enables a user to carry the carrier 20 in an upright position in which the user's back is straight, and not bending at the waist to counter balance the carrier 20. A user only needs some grip strength to maintain their grasp on the hub 1102 and grip feature 1110, but little strength is required at the bicep or shoulder to maintain the user's arm around the handle 12.

Figure 13A:
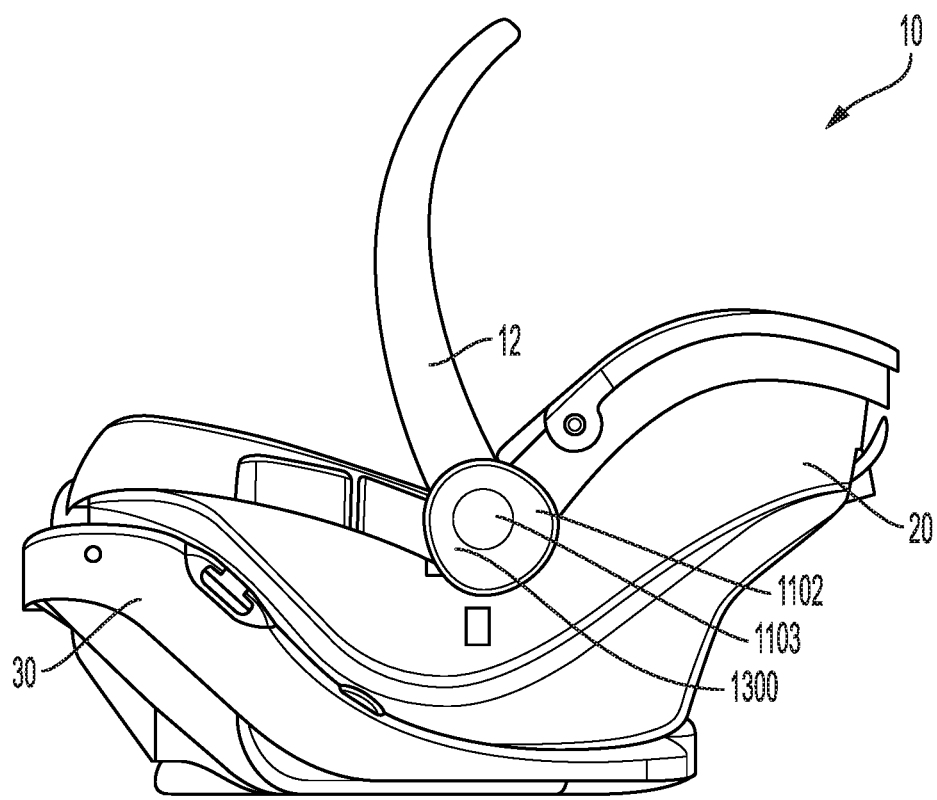
FIGS. 13A-13E illustrate an exemplary handle latching feature of the car seat configured in accordance with an embodiment of the present invention.
Figure 13C:
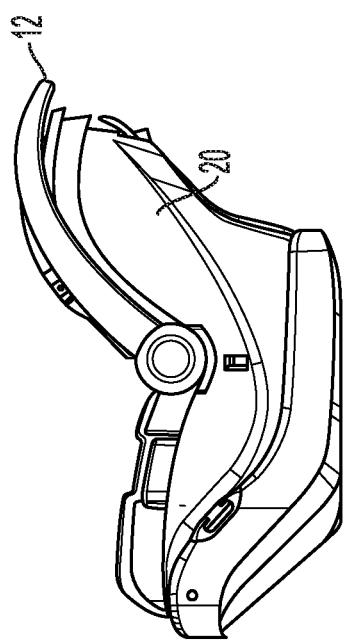
Figure 13E:
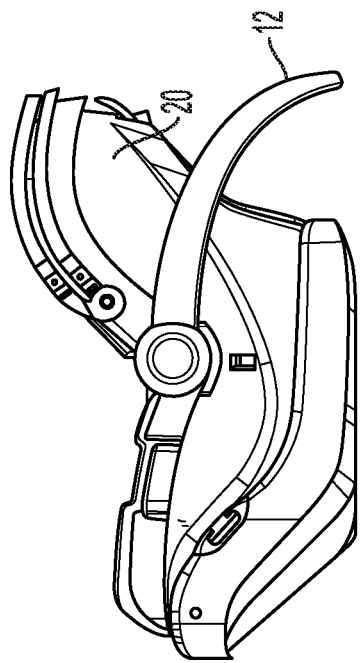

FIGS. 13A-13E illustrate an exemplary handle latching feature of the car seat. In an embodiment, the carry handle 12 can have four selectable positions, e.g., carry position (FIG. 13B), laidback position (FIG. 13C), rebound position (FIG. 13D), rock-stop position (FIG. 13E). The handle 12 can lock/latch in place in the carry position, rebound position, and rock-stop position. The handle 12 can be released and moved from a locked position by pressing both release buttons 1103 located on the handle hubs 1102. As discussed below, in the laid-back position, the handle 12 can be moved to the carry position without needing to push the release buttons 1103.

In general, to move the carry handle 12 of a car seat to various positions, both release buttons 1103 on the handle hubs 1102 need to be pressed. An exception is the laidback position that for purposes of parental convenience does not lock in place like the other available positions. In an embodiment, the handle 12 can be configured to move from the laidback position to a carry position without requiring the pressing of release buttons 1103 on the handle hubs 1102. This is a convenience feature for parents because it allows for singlehanded operation. For example, a parent may place the handle 12 in the laid back position (FIG. 13C) to allow clear access to put the child in the seat. Once the child is in the seat and buckled in, the parent will stand up, pick up their things and go to pick up the car seat, but now the handle 12 is down in the laid back position. With standard car seat handles and latch mechanisms, this requires the parent to put down their things, and use both hands to rotate and lock the handle in the carry position. In an embodiment, the present invention avoids this scenario by enabling the handle 12 to ratchet to the carry position from the laid back position without requiring the pressing of release buttons. This allows the parent to rotate the handle to the carry position with one hand. When the handle reaches the carry position, it can automatically lock in place.

Referring to FIG. 13A, in an embodiment, the present invention provides an car seat 10 having a carrier portion 20 that can include a carry handle 12 and a handle latching mechanism 1300. The carry handle 12 can be attached to the handle hubs 1102 located on opposite sides of the carrier 20. In an embodiment, the handle 12 can be moved or rotated in a bidirectional range of motion about the hub 1102.

The handle latching mechanism 1300 can be housed in the hubs 1102, and coupled to the handle 12. The handle latching mechanism 1300 can enable the handle 12 to be moved or rotated to a selected position from multiple available positions. In an embodiment, there can be four possible positions that the handle 12 can be moved to. The handle latching mechanism 1300 can be configured to lock the handle 12 in a particular position. In an embodiment, the handle 12 and latching mechanism 1300 can be configured so that the handle 12 movement ratchets from position to position.

Figure 13B:
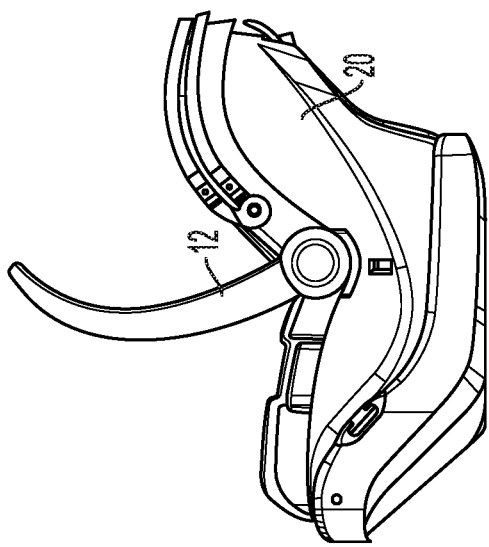

Referring to FIGS. 13B-13E, in an embodiment, the present invention provides four selectable positions that the handle 12 can be moved to. FIG. 13B displays the standard carry position in which a carrier 20 is typically utilized to carry a child. The handle 12 can be moved and latched in a substantially vertical position above the carrier 20. Once locked in this position, the handle 12 is prevented from moving in any direction until the lock is released by pressing both buttons 1103 on the hubs 1102.

Referring to FIG. 13C, in another selectable position, the carry handle 12 can be laid back along an upper edge of the carrier 20, so that the handle 12 is not in the way when a parent places or removes a child from the carrier 20. In this convenient embodiment, the handle 12 is not locked in place, so once the child is placed in or removed from the carrier 20, the handle 12 can be moved to the vertical carry position shown in FIG. 13B without needing to unlock the handle 12 by pressing the release buttons 1103 on the handle hubs 1102. This configuration allows one-hand operation of the handle 12, and is convenient when a user is holding items and cannot use both hands to press release buttons 1103 on the hubs 1102.

Figure 13D:
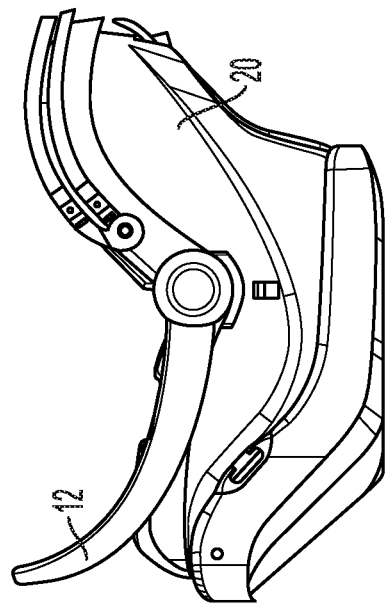

Referring to FIG. 13D, in another selectable position, the carry handle 12 can moved in front of the carrier 20 and locked in place to provide resistance to any rearward rotation of the car seat arising from sudden impact. This configuration utilizes the handle 12 as a rebound bar to control the rebound motion after a forward motion in the event of a crash. As the car seat uncompresses from the vehicle seat, this handle position limits the amount the seat can rotate. The handle 12 can be released from this position by pressing release buttons 1103 on the hubs 1102.

Referring to FIG. 13E, in another selectable position, the carry handle 12 can be rotated behind the car seat and latched in place to prevent the car seat from rocking. The handle 12 can be released from this position by pressing release buttons 1103 on the hubs 1102.

Referring to FIGS. 14A-14D, in an embodiment, the present invention provides a car seat stroller attachment. One embodiment can include a car seat 10 with a carrier portion 20 that includes a stroller attachment mechanism for releasably attaching the carrier 20 to a stroller (not shown). The attachment mechanism includes two spring-loaded doors 1402 located on opposite sides of the carrier 20. The doors 1402 can move in and out and can be spring biased toward the out (i.e., closed) position, so that the apertures that the doors 1402 are positioned in are closed when the carrier 20 is detached from a stroller.

Figure 14A:
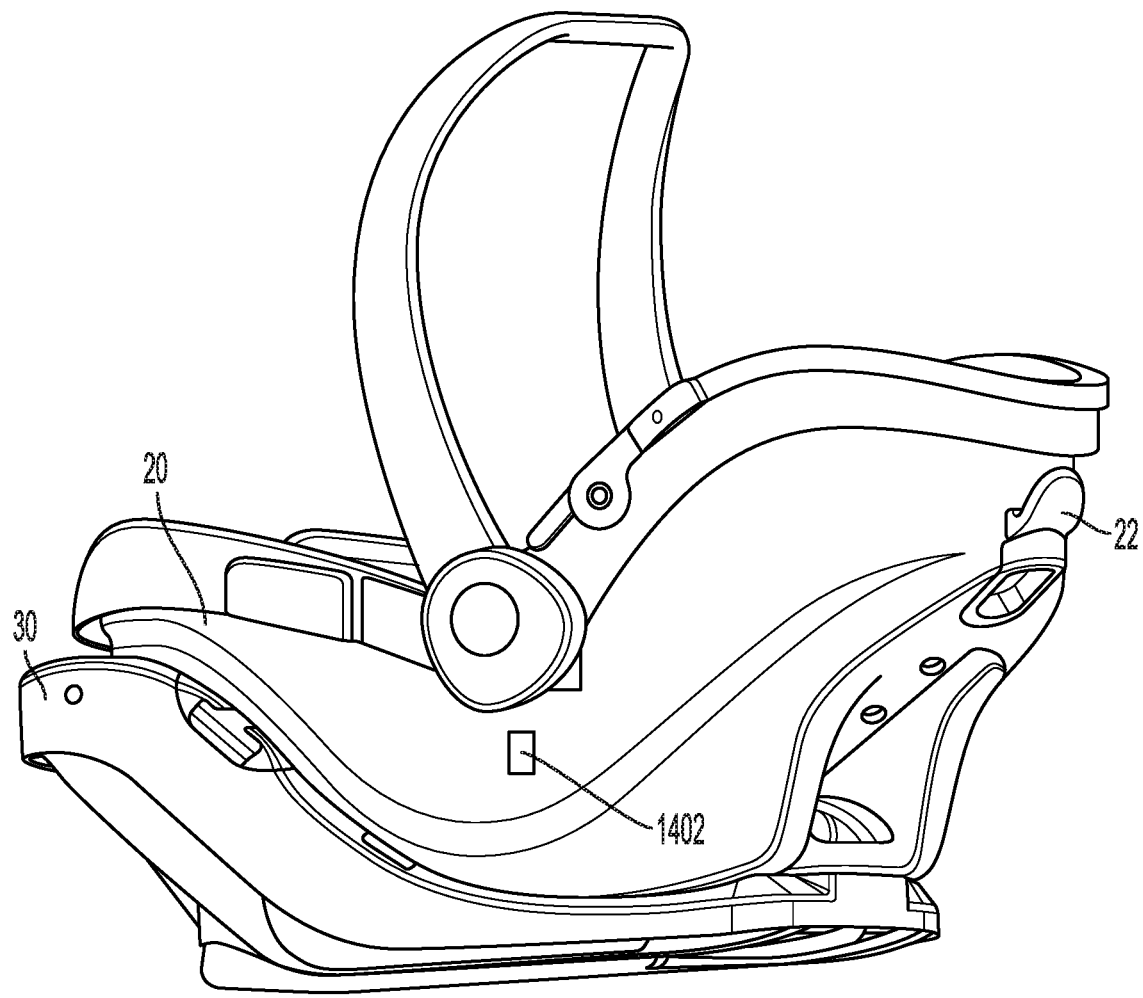
FIGS. 14A, 14B, 14C and 14D illustrate an exemplary car seat stroller attachment configured in accordance with an embodiment of the present invention.
Figure 14B:
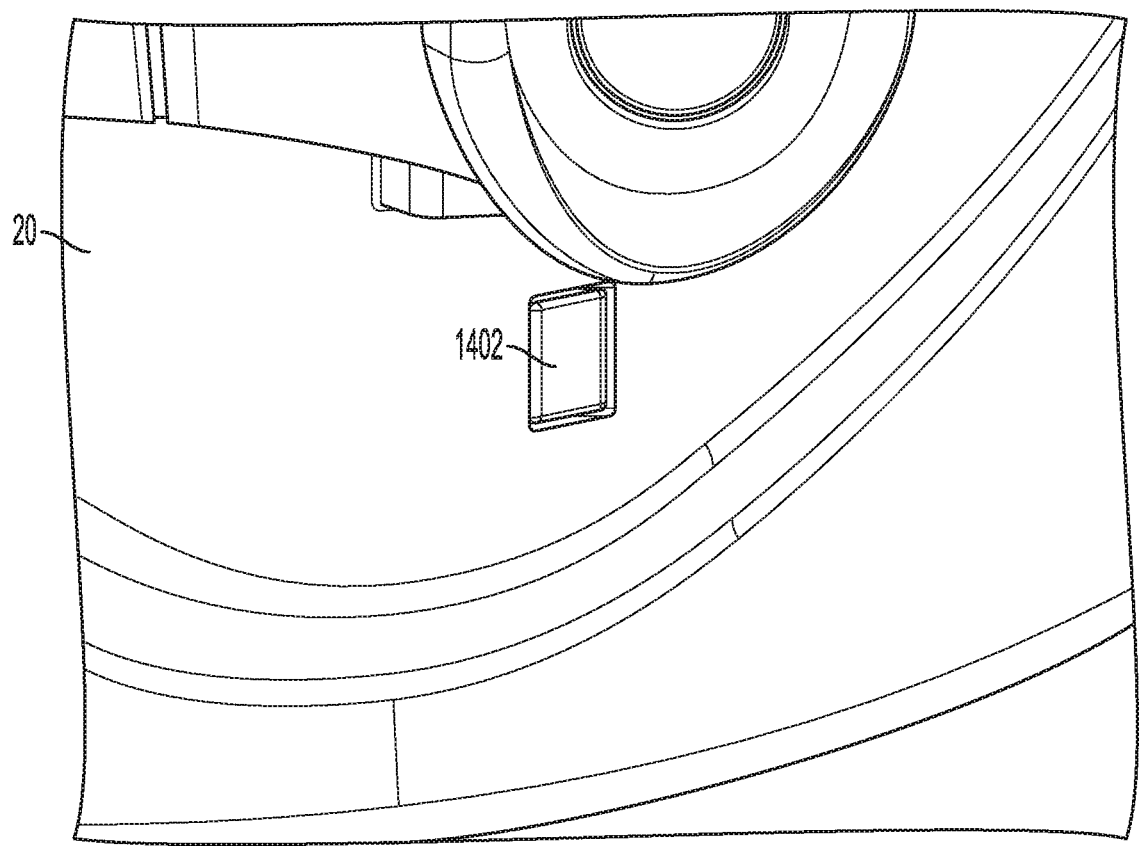
Figure 14C:
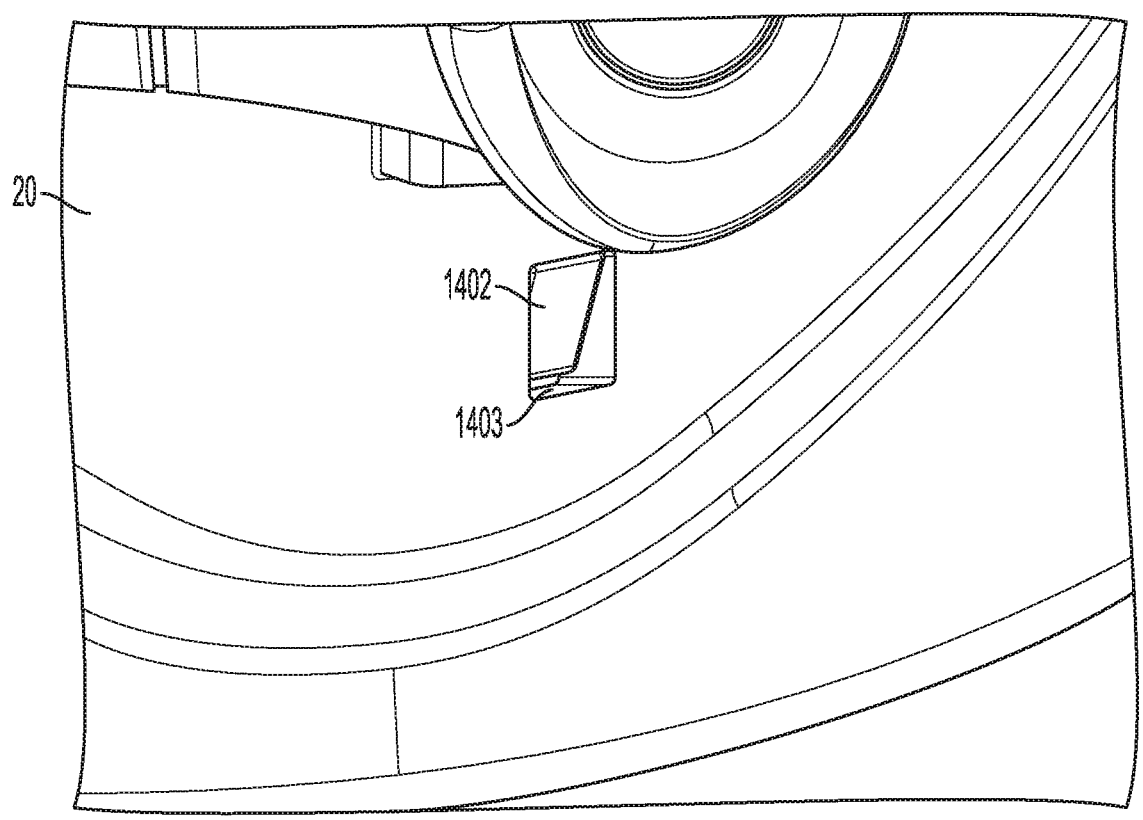
Figure 14D:
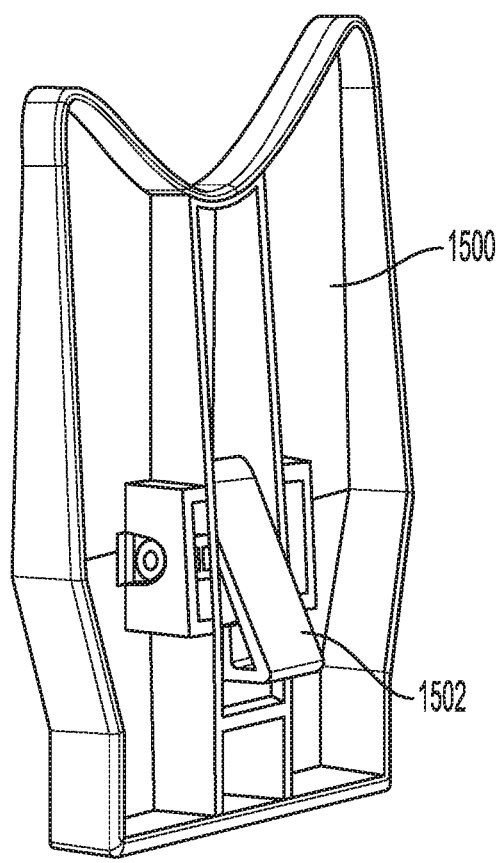

FIG. 14D illustrates an exemplary stroller attachment 1500 having a hook 1502 for attaching to the carrier 20. During installation of the carrier 20 onto a stroller, the carrier 20 doors 1402 retract inward (see FIG. 14C), upon making contact and receiving stroller attachment 1500 and hook 1502, to expose a surface 1403 for the stroller attachment hook 1502 to catch on. Once the hook 1502 is attached to the surface 1403, the carrier and stroller are securely attached. The release handle 22 on the carrier 20 can be used to move the doors 1402 to the closed position, which drives the hooks 1502 off of the surface 1403 and disengages the carrier 20 from the stroller.

As shown in FIG. 14B, the spring-loaded doors 1402 can be configured to pivot to a closed position when the release handle 22 is actuated thereby releasing the carrier 20 from the stroller. FIG. 14C illustrates the spring-loaded doors 1402 pivoting inward in response to receiving the stroller attachment 1500 with hook 1502.

In summary, the car seat shown includes two doors 1402 that pivot inward exposing a surface 1403 for a hook to catch on. The doors serve the purpose of closing off a hole when the attachment is not being used, and they also are the means by which the hook is pushed off the catch to release the car seat from a stroller. The doors are spring loaded to the closed position. Internally the doors are connected to the release handle on the back shell of the carrier 20. This is the same handle used to release the carrier 20 from the base 30. The stroller can have a post feature that extends into a receptacle behind the handle hub, and can also have a hook that is spring loaded to the extended position. When a car seat is lowered onto the posts of the stroller, the hooks on the posts push the doors 1402 open and catch on the shell of the carrier 20 so that the carrier cannot be released until the release handle 22 on the back of the carrier 20 is actuated. The spring loaded hook on the post is not connected mechanically to any actuator. It is only actuated by the carrier door 1402 when the release handle 22 on the carrier is actuated.

Moreover, in an embodiment, the stroller to car seat interaction described above can be used in connection with modular type strollers, in which the child seat of the stroller is removed and the car seat 20 is attached. In other embodiments, the carrier 20 can be positioned into the child seat of the stroller. In such a configuration, the internal surface of the stroller child seat can have hooks (that may be covered by fabric but could be revealed for travel system use), which can engage in the same area (i.e., surface 1403) on the carrier 20 as the hooks on the stroller post.

Figure 15C:
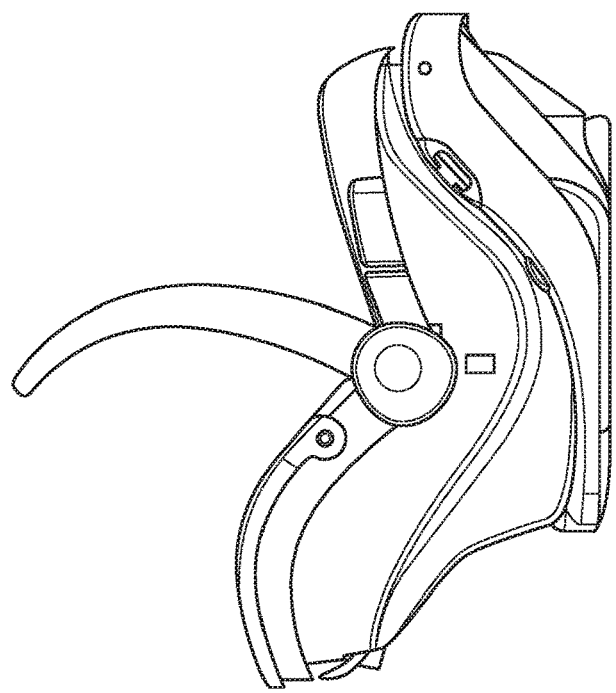
FIGS. 15A, 15B, 15C, 15D, 15E, 15F, and 15G illustrate views (e.g., perspective, top, right side, front, left side, back, bottom views) of an exemplary car seat configured in accordance with an embodiment of the present invention.
Figure 15B:
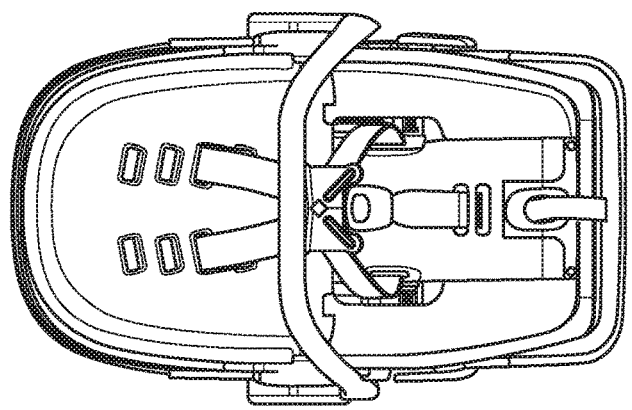
Figure 15A:
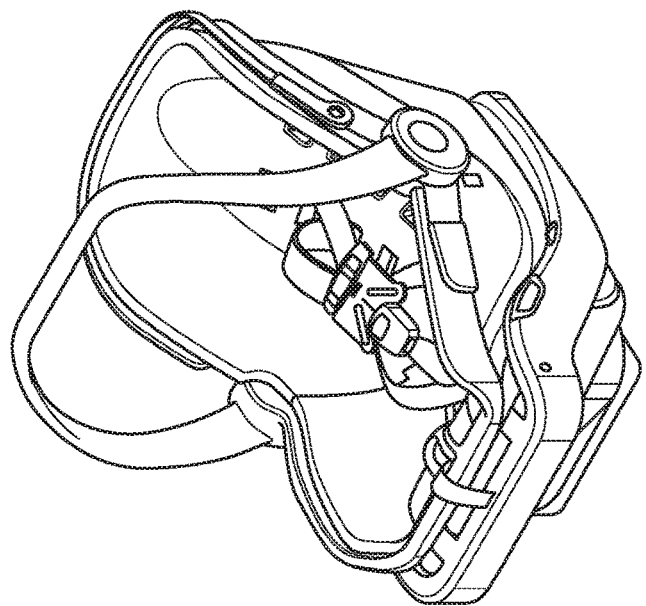
Figure 15F:
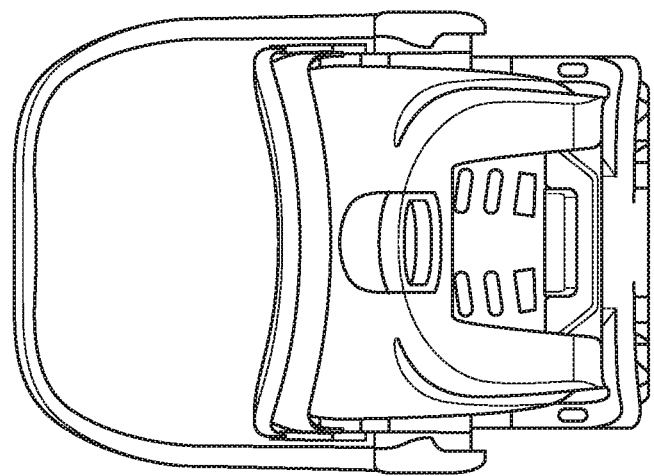
Figure 15E:
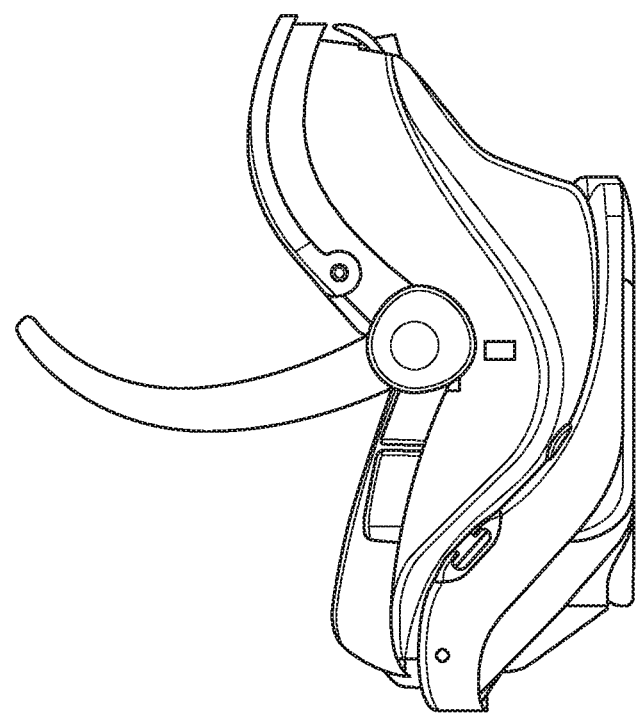
Figure 15D:
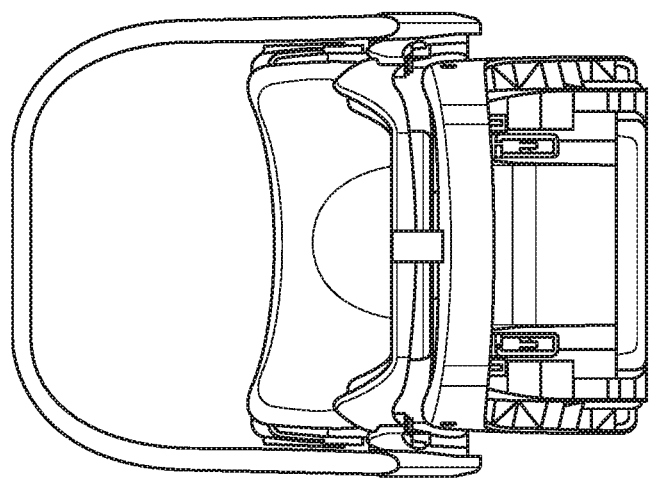
Figure 15G:
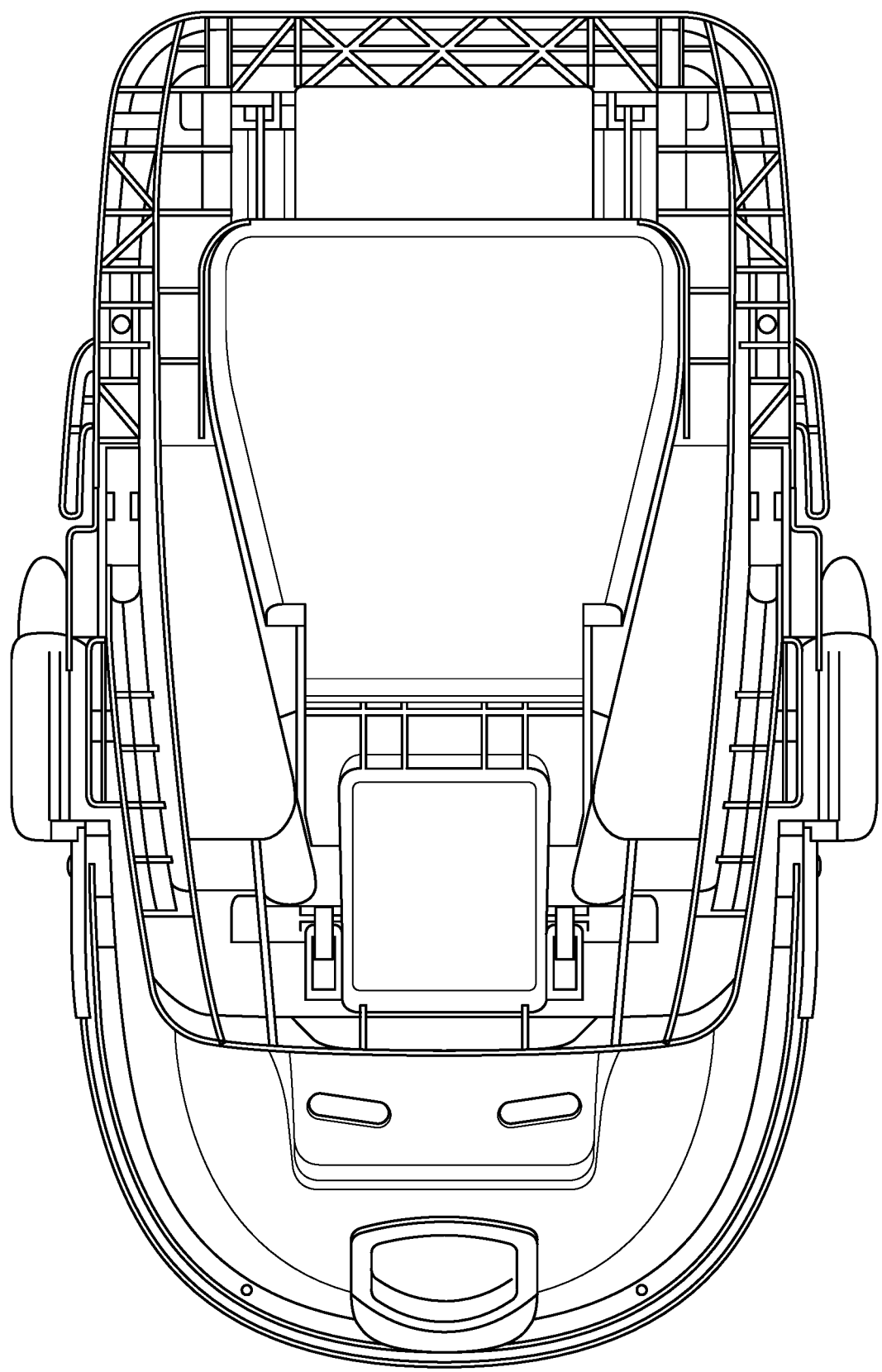

FIGS. 15A-15G illustrate the various views of an exemplary car seat configured in accordance with an embodiment of the present invention. Specifically:

FIG. 15A illustrates perspective view;
FIG. 15B illustrates a top view;
FIG. 15C illustrates a right side view;
FIG. 15D illustrates a front view;
FIG. 15E illustrates a left side view;
FIG. 15F illustrates a back view; and
FIG. 15G illustrates a bottom view.

While example embodiments have been particularly shown and described, it will be understood by those skilled in the art that various changes in form and details may be made therein without departing from the scope of the embodiments encompassed by the appended claims. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A car seat comprising:
   a carrier portion;
   a base portion, the carrier portion releasably attached to the base portion;
   a release handle coupled to the carrier portion and enabling detachment of the carrier from the base; and
   a tension arm having a first end pivotally coupled to a first end of the base portion and a second end of the tension arm releasably secured to a second end of the base portion, the tension arm configured to be pivotally raised and lowered in and out of the base portion for releasably securing the base portion to a vehicle seat;
   wherein the tension arm, when lowered into the base portion, (i) secures a vehicle belt into the base portion by retracting the vehicle belt into the base portion and retaining the vehicle belt under the tension arm and along inner side and floor surfaces of the base portion thereby preventing the vehicle belt from obstructing installation of the carrier portion on the base portion, and (ii) the tension arm forms at least part of the base portion support frame that absorbs forces and resists movement during a crash or accident.

2. The car seat of claim 1, wherein the base portion comprises an angle adjusting foot on a bottom surface of the base portion for adjusting the angle and fit between the base portion and a vehicle seat.

3. The car seat of claim 1, wherein the base portion comprises:
   at least one vehicle belt guide enabling placement of a vehicle belt on the base portion;
   a carrier alignment guide enabling placement of the carrier portion onto the base portion; and
   at least one carrier latch point enabling locking of the carrier portion onto the base portion.

4. The car seat of claim 1, wherein the base portion further comprises:
   a storage area for storing a plurality of anchor latches;
   a plurality of slots enabling latch assembly webbing to enter the storage area; and
   a webbing retainer attaching the latch assembly to the base portion outside of the storage area.

5. The car seat of claim 1, wherein the carrier comprises:
   a harness configured to restrain a child in the carrier;
   a chest clip disposed on the harness for releasably securing the harness around the child, the chest clip comprising:
      a first portion having a first actuator;
      a second portion having a second actuator;
      the first portion and the second portion releasably engaged to lock the chest clip, and simultaneous selection of the first actuator and second actuator disengaging the first portion and second portion to unlock the chest clip.

6. The car seat of claim 5, wherein the first actuator and second actuator are configured as buttons.

7. The car seat of claim 1, wherein the carrier comprises:
   a carry handle rotatably secured to handle hubs located on opposite sides of the carrier; and
   a grip feature, located under at least one of the handle hubs, providing a handgrip surface for holding the carrier.

8. The car seat of claim 7, wherein the grip feature is a cavity or slotted indentation.

9. The car seat of claim 7, wherein the grip feature is a post or other extending member.

10. A car seat carrier comprising:
    a carrier portion;
    a carry handle rotatably secured to handle hubs located on opposite sides of the carrier portion, the carry handle rotatable to a plurality of positions at least one of which provides unobstructed access to the carrier portion;
    a release button located on each handle hub and configured to release the carry handle from a locked position by simultaneous selection of each release button; and
    the carry handle configured for rotation from the at least one carry handle position providing unobstructed access to the carrier portion to a substantially vertical and locked carry position above the carrier portion without actuating the release buttons.

11. The car seat of claim 1 wherein the carrier comprises a stroller attachment mechanism for releasably attaching the car seat to a stroller, the attachment mechanism comprising:
    a first spring-loaded door and a second spring-loaded door located on opposite sides of the carrier, each spring-loaded door configured to pivot inward with respect to the carrier thereby exposing a surface for a stroller attachment to catch on; and
    wherein the release handle is further enabled to disengage the stroller attachment mechanism to release the carrier from the stroller.

12. The car seat of claim 11 wherein the spring-loaded doors pivots to a closed position when the release handle is actuated.

13. The car seat of claim 11 wherein the spring-loaded doors pivot inward in relation to the carrier in response to receiving a stroller attachment.

14. The car seat of claim 1, wherein the carrier comprises:
    A detachable crotch belt comprising:
       a strap having a first end and a second end and a length therebetween;
       a clip coupled to the first end of the strap; and
       a buckle coupled to the second end of the strap and configured to releasably attach to a harness for securing a child in the carrier; and
    a plurality of slots disposed on a seat portion of the carrier for releasably securing the crotch belt to the carrier and adjusting length of the crotch belt; and
    wherein the crotch belt is utilized at its full length by passing the clip through one of the slots and securing the clip on an opposite side of the slot.

15. The car seat of claim 14, wherein the length of the crotch belt can be adjusted by passing the clip through one of the slots, then passing the clip through an adjacent slot and securing the clip on the opposite side of the adjacent slot.

16. The car seat of claim 1, wherein the car seat can be configured as either a rear-facing car seat or a forward-facing car seat.

17. A car seat base comprising:
    a base portion having a first end and a second end; and
    a tension arm having a first end pivotally coupled to the first end of the base portion and a second end of the tension arm releasably secured to the second end of the base portion, the tension arm configured to be pivotally raised and lowered in and out of the base portion for releasably securing the base portion to a vehicle seat, wherein the tension arm, when lowered into the base portion, (i) secures a vehicle belt into the base portion by retracting the vehicle belt into the base portion and retaining the vehicle belt under the tension arm and along inner side and floor surfaces of the base portion thereby preventing the vehicle belt from obstructing installation of the carrier portion on the base portion, and, and (ii) the tension arm forms at least part of the base portion support frame that absorbs forces and resists movement during a crash or accident.

\* \* \* \* \*